US008899024B2

(12) United States Patent
Masaki et al.

(10) Patent No.: US 8,899,024 B2
(45) Date of Patent: Dec. 2, 2014

(54) ENGINE EXHAUST PURIFICATION DEVICE

(75) Inventors: Nobuhiko Masaki, Ageo (JP); Kiminobu Hirata, Saitama (JP); Jin Kusaka, Tokyo (JP); Hideaki Kato, Tokyo (JP); Yasumasa Notake, Tokyo (JP)

(73) Assignees: UD Trucks Corporation, Ageo-shi (JP); Waseda University, Tokyo (JP)

( * ) Notice: Subject to any disclaimer, the term of this patent is extended or adjusted under 35 U.S.C. 154(b) by 168 days.

(21) Appl. No.: 13/616,615

(22) Filed: Sep. 14, 2012

(65) Prior Publication Data
US 2013/0064717 A1 Mar. 14, 2013

Related U.S. Application Data
(63) Continuation of application No. PCT/JP2011/056559, filed on Mar. 18, 2011.

(30) Foreign Application Priority Data
Mar. 25, 2010 (JP) ................. 2010-069326

(51) Int. Cl.
F01N 3/00 (2006.01)
F01N 3/18 (2006.01)
F01N 3/20 (2006.01)
G05B 17/00 (2006.01)

(52) U.S. Cl.
CPC ................. *G05B 17/00* (2013.01); *Y02T 10/24* (2013.01); *F01N 2900/1622* (2013.01); *F01N 3/18* (2013.01); *F01N 3/208* (2013.01); *F01N 2560/026* (2013.01); *F01N 2610/02* (2013.01); *F01N 2560/06* (2013.01); *F01N 2560/025* (2013.01); *F01N 2610/146* (2013.01); *F01N 2900/0406* (2013.01); *F01N 2900/0411* (2013.01); *F01N 2900/1402* (2013.01)
USPC ................. 60/286; 60/295; 60/301

(58) Field of Classification Search
CPC ..... F01N 3/208; F01N 3/18; F01N 2560/025; F01N 2560/026; F01N 2560/06; F01N 2610/02; F01N 2610/146; F01N 2900/0411; F01N 2900/1402; F01N 2900/1622; F01N 2900/0406; G05B 17/00; Y02T 10/24
USPC .................................... 60/272–324
See application file for complete search history.

(56) References Cited

U.S. PATENT DOCUMENTS 8,240,132 B2 * 8/2012 Gandhi et al. ................. 60/286
8,516,798 B2 * 8/2013 Dobson et al. ................. 60/286

(Continued)

FOREIGN PATENT DOCUMENTS

JP 2000-027627 A 1/2000
JP 2003-117346 A 4/2003

(Continued)

OTHER PUBLICATIONS

Japanese Patent Office Action dated Jun. 3, 2014 in Appln No. 2012-506983 with its English Translation.

(Continued)

*Primary Examiner* — Jesse Bogue
(74) *Attorney, Agent, or Firm* — Foley & Lardner LLP

(57) ABSTRACT

An engine exhaust purification device comprises: a selective reduction type NOx catalyst; an oxidation catalyst disposed on an upstream side of the NOx catalyst; a reducing agent adding device which adds an NOx reducing agent to an exhaust gas of an engine; a control device which controls the reducing agent adding device; and an $NO_2$ ratio calculation device which estimates an $NO_2$ ratio of the exhaust gas flowing into the NOx catalyst. The $NO_2$ ratio of the exhaust gas flowing into the NOx catalyst is calculated by a catalytic reaction model where the oxidation reaction of NO in the oxidation catalyst is numerically formulated, and the $NO_2$ ratio is reflected to calculate an amount of ammonia adsorbed on the NOx catalyst by a catalytic reaction model where a chemical reaction concerned with the reduction of NOx in the NOx catalyst is numerically formulated.

18 Claims, 22 Drawing Sheets

(56) References Cited

U.S. PATENT DOCUMENTS

| | | |
|---|---|---|
| 2009/0293459 A1 | 12/2009 | Shimomura et al. |
| 2011/0060465 A1 | 3/2011 | Cho |
| 2012/0173022 A1 | 7/2012 | Cho |

FOREIGN PATENT DOCUMENTS

| | | |
|---|---|---|
| JP | 2007-255345 A | 10/2007 |
| JP | 2008-196340 A | 8/2008 |
| JP | 2008-261253 A | 10/2008 |
| JP | 2009-293444 A | 12/2009 |
| JP | 2011-058485 A | 3/2011 |

OTHER PUBLICATIONS

Chinese Office Action with English Language Translation dated Jun. 27, 2014 13 pgs.

* cited by examiner

ENGINE EXHAUST PURIFICATION DEVICE

This application is a Continuation of PCT Application PCT/JP2011/056559, filed Mar. 18, 2011, which claims priority from prior Japanese Patent Application No. 2010-069326, filed Mar. 25, 2010, the entire contents of all of which are incorporated herein by reference.

TECHNICAL FIELD

The present invention relates to an engine exhaust purification device which reduces nitrogen oxides (hereinafter abbreviated to "NOx") in an exhaust gas by use of ammonia as a reducing agent to purify the exhaust gas, and more particularly, it relates to a technology of estimating an amount of ammonia adsorbed on a catalyst layer of an NOx catalyst by a numerical model to control an amount of the ammonia to be supplied to the NOx catalyst in accordance with the calculated amount of the adsorbed ammonia.

BACKGROUND ART

In a catalyst system which reduces NOx discharged from a typical lean burn engine of a diesel engine by use of ammonia as a reducing agent to purify the exhaust gas, the use of an aqueous solution of urea which is a precursor of the ammonia (hereinafter referred to as "the urea aqueous solution") as an ammonia generating source has been investigated (JP-A-2000-027627 or the like), and such a technology has already been put to practical use.

In the catalyst system where such an urea aqueous solution is used (hereinafter referred to as "the urea SCR"), a selective reduction type NOx catalyst (hereinafter referred to simply as "the NOx catalyst") is disposed in an exhaust passage of the engine, and a reducing agent adding device which injects and supplies the urea aqueous solution to the exhaust gas is further disposed on an upstream side of this NOx catalyst. The urea in the urea aqueous solution supplied to the exhaust gas by the reducing agent adding device causes hydrolysis by exhaust heat, to generate the ammonia, and this ammonia reacts with NOx in the exhaust gas on a catalyst layer of the NOx catalyst, whereby the NOx is reduced to purify the exhaust gas.

Here, ammonia which passes through the NOx catalyst without reacting with the NOx (hereinafter, this phenomenon will be referred to as "the ammonia slip") is present, depending on an operation state of the engine. The ammonia slip is stipulated in a technical guideline ("Technical Guideline of Urea Selective Reduction Type Catalyst System") established by Road Transport Bureau of the Ministry of Land, Infrastructure, Transport and Tourism, and the above stipulation is important for the practical use of the urea SCR not only to decrease an amount of the NOx to be discharged into the atmosphere but also to suppress the ammonia slip as much as possible.

In a generally employed NOx catalyst such as a zeolite catalyst, an adsorption ability thereof is utilized to adsorb ammonia on the catalyst layer at a low temperature, whereby opportunities for contact between ammonia and NOx are increased, and an NOx purification ratio is increased. However, when the amount of the ammonia which is close to a saturated state is already adsorbed at the low temperature but the urea aqueous solution is continuously supplied without taking this into consideration, the amount of the ammonia which is in excess of an upper limit corresponding to the adsorption ability is not adsorbed on the catalyst layer, but the ammonia passes through the NOx catalyst as it is. On the other hand, when the urea aqueous solution continues to be supplied at an increasing load operation such as acceleration without taking the amount of the adsorbed ammonia into consideration, the desorption of the adsorbed ammonia occurs owing to the rise of an exhaust temperature, which results in the promotion of the ammonia slip. Therefore, in the urea SCR, it is necessary to supply the urea aqueous solution in consideration of the amount of the ammonia adsorbed on the NOx catalyst (hereinafter referred to as "the ammonia adsorption amount"). Here, concerning the urea SCR in consideration of the ammonia adsorption amount, the following technology is present.

An amount of ammonia to be consumed by the reduction of NOx is calculated from engine NOx emissions and an NOx purification ratio in accordance with a temperature of an NOx catalyst, and a balance obtained by subtracting this calculated amount from the previously calculated amount of held ammonia is calculated as the present amount of the held ammonia (the following patent document 1). Then, an amount of an ammonia solution to be supplied is controlled so that the calculated amount of the held ammonia falls within a predetermined range. Here, a map set beforehand by an experiment or the like is generally used in the calculation of the NOx purification ratio.

PRIOR ART DOCUMENTS

Patent Documents

Patent Document 1: JP-A-2008-261253 (paragraph Nos. 0053 and 0054)

SUMMARY OF THE INVENTION

Problems to be Solved by the Invention

Thus, in the technology disclosed in the above patent document 1, an amount of ammonia adsorbed on an NOx catalyst is calculated by use of a preset map, and this amount is not estimated by a numerical model.

Means for Solving the Problems

In the present invention, there is designed a catalytic reaction model where a reduction chemical reaction which occurs in an NOx catalyst is numerically formulated, and this model is incorporated into a control device concerned with reducing agent addition, which enables the accurate estimation of an ammonia adsorption amount, to cope with both the enhancement of an NOx purification ratio and the suppression of an ammonia slip.

In a configuration of the present invention, there is provided an engine exhaust purification device comprising: a selective reduction type NOx catalyst disposed in an exhaust passage of an engine; a reducing agent adding device which adds ammonia or a precursor thereof to an exhaust gas of the engine on an upstream side of the NOx catalyst; and a control device which calculates an amount of the ammonia to be supplied to the NOx catalyst to control the reducing agent adding device in accordance with the calculated amount of the ammonia to be supplied. Here, the control device includes a first storage section in which there is stored a first catalytic reaction model where a chemical reaction concerned with the reduction of NOx by use of the ammonia adsorbed on a catalyst layer of the NOx catalyst as an effective reducing agent is numerically formulated; an ammonia adsorption amount calculating section which acquires the first catalytic reaction model from the first storage section, and calculates ammonia adsorption amounts of a plurality of cells by the acquired first catalytic reaction model, the respective cells being obtained by dividing the inside of the NOx catalyst so that the cells are continuously aligned in an axial direction of the catalyst; and an ammonia supply amount calculating section which calculates the amount of the ammonia to be supplied, based on the ammonia adsorption amount of the predetermined cell corresponding to an operation state of the engine, among the ammonia adsorption amounts of the respective cells which are calculated by the ammonia adsorption amount calculating section.

In another configuration according to the present invention, concerning an oxidation catalyst disposed on an upstream side of an NOx catalyst in an exhaust passage of an engine, there is constructed a second catalytic reaction model where an oxidation reaction of nitrogen monoxide (NO) in the oxidation catalyst is numerically formulated, and a ratio of nitrogen dioxide ($NO_2$) in an exhaust gas flowing into the NOx catalyst is estimated by the second catalytic reaction model to reflect this estimated ratio in the calculation of an amount of ammonia to be supplied, which enables the calculation of the amount of the ammonia to be supplied in accordance with an actual operation state. Here, an $NO_2$ ratio calculation device which estimates the $NO_2$ ratio includes a second storage section in which the second catalytic reaction model is stored; and an $NO_2$ ratio calculating section which acquires the second catalytic reaction model from the second storage section, calculates the $NO_2$ ratio of the exhaust gas passing through each of a plurality of cells by the acquired second catalytic reaction model, the respective cells being obtained by dividing the inside of the oxidation catalyst so that the cells are continuously aligned in an axial direction of the catalyst, and calculates the $NO_2$ ratio of the exhaust gas passing through the cell positioned on the most downstream side among the plurality of cells, as the $NO_2$ ratio of the exhaust gas flowing into the NOx catalyst. A control device calculates the amount of the ammonia to be supplied to the NOx catalyst based on the $NO_2$ ratio calculated by the $NO_2$ ratio calculation device.

In still another configuration, there is provided an engine exhaust purification device comprising: a selective reduction type NOx catalyst disposed in an exhaust passage of an engine; an oxidation catalyst disposed on an upstream side of the NOx catalyst in the exhaust passage; a reducing agent adding device which adds ammonia or a precursor thereof to an exhaust gas of the engine on the upstream side of the NOx catalyst; an $NO_2$ ratio calculation device which estimates an $NO_2$ ratio of the exhaust gas flowing into the NOx catalyst; and a control device which calculates an amount of the ammonia to be supplied to the NOx catalyst based on the $NO_2$ ratio calculated by the $NO_2$ ratio calculation device, to control the reducing agent adding device in accordance with the calculated amount of the ammonia to be supplied. Here, the $NO_2$ ratio calculation device includes a second storage section in which a second catalytic reaction model is stored; and an $NO_2$ ratio calculating section which acquires the second catalytic reaction model from the second storage section, calculates the $NO_2$ ratio of the exhaust gas passing through each of a plurality of cells by the second catalytic reaction model, the respective cells being obtained by dividing the inside of the oxidation catalyst so that the cells are continuously aligned in an axial direction of the catalyst, and calculates the $NO_2$ ratio of the exhaust gas passing through the cell positioned on the most downstream side among the plurality of cells, as the $NO_2$ ratio of the exhaust gas flowing into the NOx catalyst.

Advantageous Effect of the Invention

According to the present invention, a catalytic reaction model (the first catalytic reaction model) where a reduction chemical reaction occurring in an NOx catalyst is numerically formulated is incorporated into a control device concerned with reducing agent addition, and an ammonia adsorption amount of the NOx catalyst is calculated by the first catalytic reaction model, which enables the accurate estimation of the ammonia adsorption amount without using any maps. Moreover, an amount of the ammonia to be supplied to the NOx catalyst is calculated based on the ammonia adsorption amount calculated by the first catalytic reaction model, and the ammonia adsorption amount of a predetermined cell corresponding to an operation state of an engine is further used in the calculation of the amount of the ammonia to be supplied, which enables the suitable setting of the amount of the ammonia to be supplied in consideration of a catalyst axial distribution of the ammonia adsorption amounts, so that it is possible to cope with both the enhancement of an NOx purification ratio and the suppression of an ammonia slip.

Furthermore, according to the present invention, concerning an oxidation catalyst disposed on an upstream side of the NOx catalyst, there is constructed a second catalytic reaction model where the oxidation reaction of nitrogen monoxide (NO) in the oxidation catalyst is numerically formulated, and an $NO_2$ ratio of an exhaust gas flowing into the NOx catalyst is estimated by the second catalytic reaction model, to reflect this estimated ratio in the calculation of the amount of the ammonia to be supplied to the NOx catalyst, which enables more suitable calculation of the amount of the ammonia to be supplied in accordance with an actual operation state.

The other objects and characteristics of the present invention will become apparent from the following description with reference to the accompanying drawings.

The whole contents of Japanese Patent Application No. 2010-069326 which is the basis of claim for priority are incorporated as part of the present application, and referred to in the following description.

MODE FOR CARRYING OUT THE INVENTION

Hereinafter, embodiments of the present invention will be described with reference to the drawings.

Figure 1:
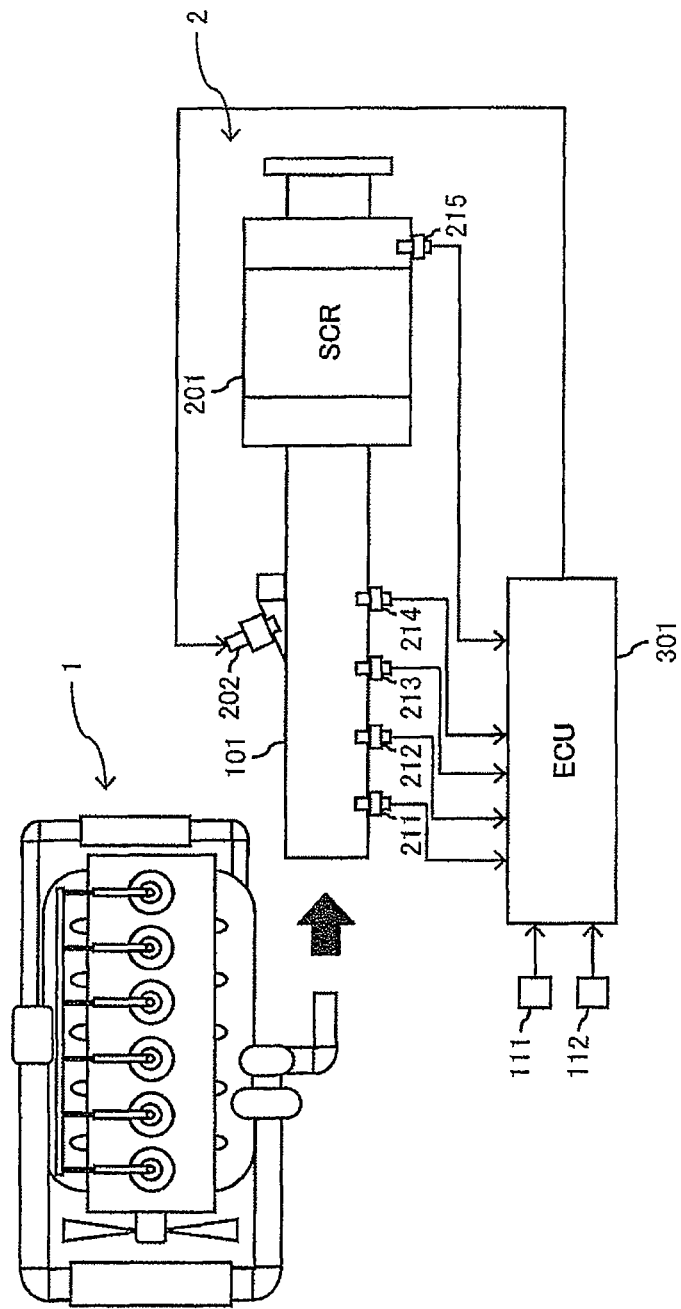
FIG. 1 is a constitutional view of a diesel engine and an exhaust purification device of the engine according to a first embodiment.

FIG. 1 is a constitutional view of a diesel engine (hereinafter referred to simply as "the engine") 1 and an exhaust purification device 2 according to a first embodiment of the present invention.

The exhaust purification device 2 according to the present embodiment includes a selective reduction type NOx catalyst 201 disposed around an exhaust pipe 101 of the engine 1, and an urea aqueous solution injector 202 (corresponding to "the reducing agent adding device") disposed so that an urea aqueous solution can be supplied to an exhaust gas on an upstream side of the NOx catalyst 201, and NOx discharged from the engine 1 is reduced by using, as a reducing agent, ammonia from a generation source of the urea aqueous solution supplied to the exhaust gas by the urea aqueous solution injector 202. Although not shown, in the present embodiment, an oxidation catalyst is disposed on the upstream side of the NOx catalyst 201, and part of NO in the exhaust gas is converted to $NO_2$ by this oxidation catalyst, to achieve a balance between nitrogen monoxide (NO) and nitrogen dioxide ($NO_2$) in the exhaust gas flowing into the NOx catalyst 201.

On the upstream side of the NOx catalyst 201 in the exhaust pipe 101 (in the present embodiment, between the NOx catalyst 201 and the not-shown oxidation catalyst), an NOx sensor 211, a temperature sensor 212, a pressure sensor 213 and an oxygen sensor 214 are arranged, whereas on a downstream side thereof, a pressure sensor 215 is disposed. The NOx sensor 211 detects an NOx concentration of the exhaust gas in the upstream of the NOx catalyst 201 (hereinafter referred to as "the SCR upstream NOx concentration"), the temperature sensor 212 detects an exhaust temperature of the upstream of the NOx catalyst 201 (hereinafter referred to as "the SCR upstream exhaust temperature"), and the pressure sensor 213 detects an exhaust pressure of the upstream of the NOx catalyst 201 (hereinafter referred to as "the SCR upstream exhaust pressure"), respectively. Then, the oxygen sensor 214 outputs an electric signal corresponding to an oxygen concentration of the exhaust gas in the upstream of the NOx catalyst 201 (hereinafter referred to as "the SCR upstream oxygen concentration"). The pressure sensor 215 is attached to a case of the NOx catalyst 201 on the downstream side thereof, and detects a pressure in the vicinity of an outlet of the NOx catalyst 201 (hereinafter referred to as "the SCR outlet pressure"). Detection signals of the NOx sensor 211, the temperature sensor 212, the pressure sensor 213, the oxygen sensor 214 and the pressure sensor 215 are input into a reducing agent addition control unit 301 (corresponding to "the control device", and hereinafter abbreviated to "ECU") described later. Additionally, in the present embodiment, operation state sensors 111 and 112 are arranged, and a fuel flow rate and an engine rotation speed which are indexes indicating the operation state of the engine 1 are detected by the sensors 111 and 112, and input into the ECU 301.

The ECU 301 calculates an amount of ammonia to be supplied to the NOx catalyst 201 based on the input various sensor outputs, to control the urea aqueous solution injector 202.

Figure 2:
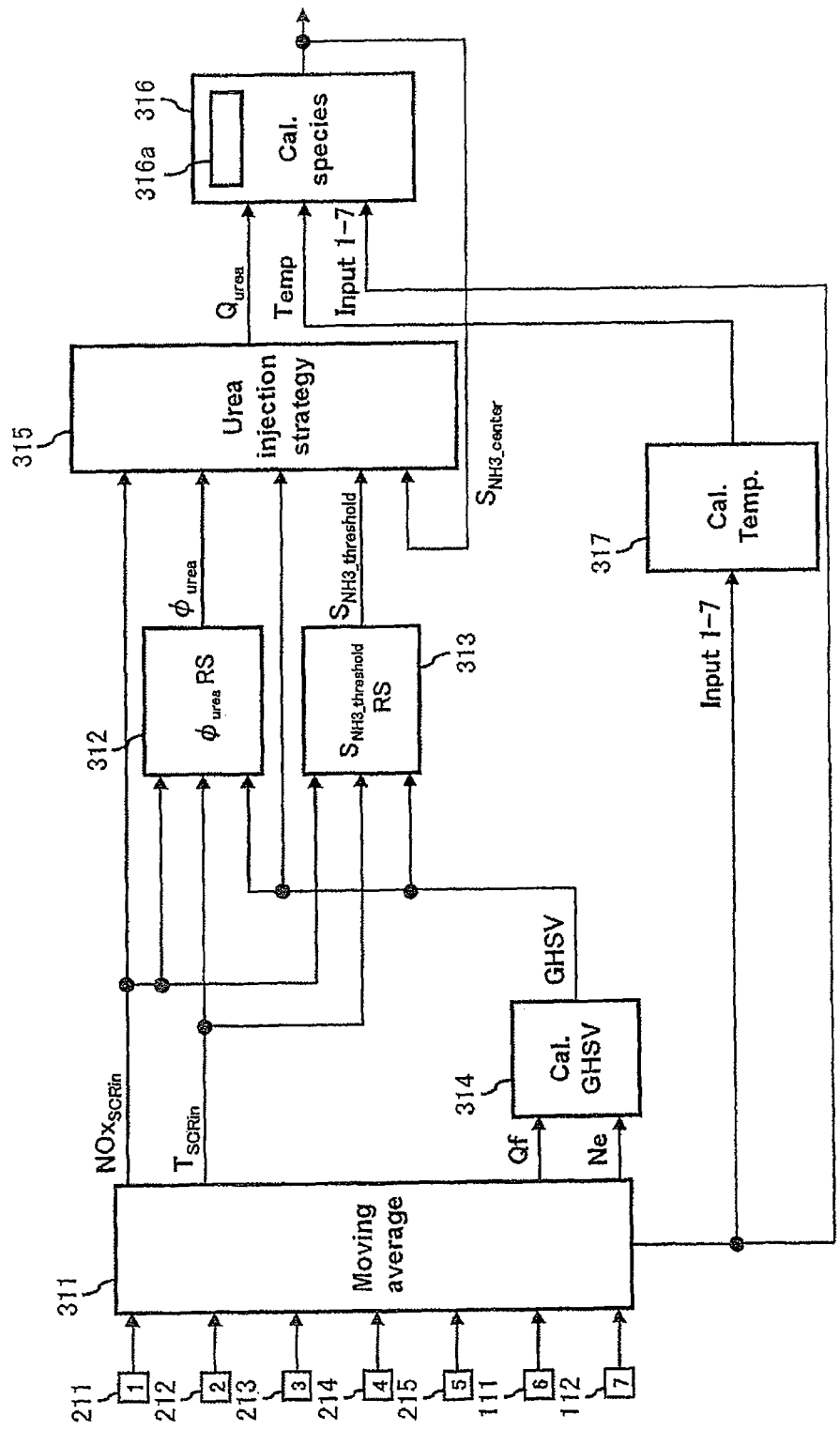
FIG. 2 is a constitutional view of a reducing agent addition control unit according to the first embodiment.

FIG. 2 shows a constitution of the urea aqueous solution addition control unit (ECU) 301 according to the present embodiment by a block diagram.

In the present embodiment, a catalytic reaction model where a reduction chemical reaction occurring in the NOx catalyst 201 is numerically formulated (corresponding to "the first catalytic reaction model", and hereinafter referred to as "the SCR catalytic reaction model") is incorporated into an ammonia adsorption amount calculating section 316, and an ammonia adsorption amount of the NOx catalyst 201 is calculated from an urea aqueous solution injection amount $Q_{urea}$ and operation conditions of the exhaust purification device 2 by this SCR catalytic reaction model.

An average value calculating section 311 calculates a moving average value (e.g., a ten-points moving average value) of the respective types of sensor outputs input into the ECU 301. In consequence, influences of hourly fluctuations of the sensor outputs on the calculation of the ammonia adsorption amount are alleviated.

An urea equivalence ratio calculating section 312 and an ammonia target adsorption amount calculating section 313 calculate an urea equivalence ratio $\phi_{urea}$ and an ammonia target adsorption amount $S_{NH3\_threshold}$ from response surfaces stored beforehand, based on an average value $NOX_{SCRin}$ of SCR upstream NOx concentrations and an average value $T_{SCRin}$ of SCR upstream exhaust temperatures which are calculated by the average value calculating section 311, and a space velocity GHSV of the NOx catalyst 201. In the present embodiment, in the setting of the response surfaces of the urea equivalence ratio and the ammonia target adsorption amount, a ratio (a molar ratio) between $NO_2$ and NO in the exhaust gas flowing into the NOx catalyst 201 is approximated to 1:1. The space velocity (the gas hourly space velocity) GHSV is calculated by a space velocity calculating section 314, and the space velocity calculating section 314 calculates the space velocity GHSV based on the operation state of the engine 1 (in the present embodiment, a fuel flow rate Qf and an engine rotation speed Ne).

An urea aqueous solution injection amount calculating section 315 calculates the urea aqueous solution injection amount $Q_{urea}$ based on the urea equivalence ratio $\phi_{urea}$ and the ammonia target adsorption amount $S_{NH3\_threshold}$ calculated by the urea equivalence ratio calculating section 312 and the ammonia target adsorption amount calculating section 313, an ammonia adsorption amount $S_{NH3\_i}$ (in the present embodiment, $S_{NH3\_center}$ described later) calculated by the ammonia adsorption amount calculating section 316 described later, the SCR upstream NOx concentration $NOX_{SCRin}$ and the space velocity GHSV. The urea aqueous solution injection amount $Q_{urea}$ is output to the ammonia adsorption amount calculating section 316, whereas the amount is converted to a control instruction signal for the urea aqueous solution injector 202, and output to a not-shown drive unit of the urea aqueous solution injector 202.

The ammonia adsorption amount calculating section 316 calculates the ammonia adsorption amounts $S_{NH3\_i}$ of the respective cells by the SCR catalytic reaction model, based on the urea aqueous solution injection amount $Q_{urea}$ calculated by the urea aqueous solution injection amount calculating section 315, a temperature Temp of the catalyst layer of the NOx catalyst 201 which is calculated by a catalyst temperature calculating section 317 and the respective types of sensor outputs. In the present embodiment, the SCR catalytic reaction model is stored in a storage section 316a which can be embodied in the form of a nonvolatile memory (e.g., a flash memory) or the like, and the model is read from the storage section 316a by the ammonia adsorption amount calculating section 316 during reducing agent addition control. Among the calculated ammonia adsorption amounts $S_{NH3\_i}$, the ammonia adsorption amount $S_{NH3}$ (in the present embodiment, $S_{NH3\_center}$) of the predetermined cell corresponding to the operation state of the engine 1 is input into the urea aqueous solution injection amount calculating section 315, and used in the calculation of the urea aqueous solution injection amount $Q_{urea}$.

In the present embodiment, the urea equivalence ratio calculating section 312, the ammonia target adsorption amount calculating section 313 and the urea aqueous solution injection amount calculating section 315 correspond to "the ammonia supply amount calculating section", the ammonia adsorption amount calculating section 316 corresponds to "the ammonia adsorption amount calculating section", and the storage section 316a corresponds to "the first storage section", respectively.

Here, the catalytic reaction model according to the present embodiment will be described.

In the present embodiment, there is designed the catalytic reaction model (the SCR catalytic reaction model) where a series of chemical reactions concerned with the reduction of NOx by use of the ammonia adsorbed on the catalyst layer of the NOx catalyst 201 (hereinafter referred to especially as "the adsorbed ammonia") as an effective reducing agent are numerically formulated. The effective reducing agent is a reducing agent which actually contributes to the reduction of NOx, and the ammonia adsorbed on an adsorption site or an active point σ of the catalyst layer is represented by chemical symbol $\sigma NH_3$. This adsorbed ammonia $\sigma NH_3$ is the effective reducing agent according to the present embodiment. Hereinafter, chemical reactions which are taken into consideration in the present embodiment will be described. The reduction chemical reaction of NOx is constituted of hydrolysis of ammonia, adsorption and desorption of the ammonia, the reduction of NOx by use of the adsorbed ammonia as the effective reducing agent, and oxidation of the adsorbed ammonia.

$(NH_2)_2CO + H_2O \rightarrow 2NH_3 + CO_2$ $NH_3 + \sigma \Leftrightarrow \sigma NH_3$ $NO + NO_2 + 2\sigma NH_3 \rightarrow 2N_2 + 3H_2O + 2\sigma$ $4\sigma NH_3 + 3O_2 \rightarrow 2N_2 + 6H_2O + 4\sigma$ [Formula 1]

Figure 3:
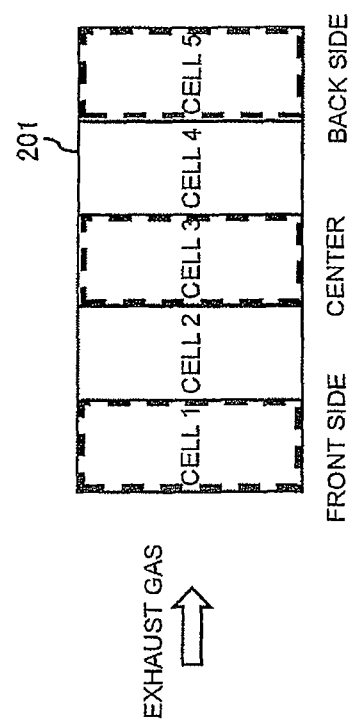
FIG. 3 is an explanatory view of an ammonia adsorption amount estimating portion (the cell) of an NOx catalyst according to the first embodiment.

In the present embodiment, as shown in FIG. 3, the inside of the NOx catalyst 201 is divided into a plurality of cells (cells 1 to 5) which are continuously aligned in an axial direction of the catalyst, and the ammonia adsorption amount $S_{NH3\_i}$ (i=1 to 5) of each of these cells 1 to 5 is calculated by use of the SCR catalytic reaction model. Then, the ammonia adsorption amount of the predetermined cell corresponding to the operation state of the engine 1 among the calculated five ammonia adsorption amounts $S_{NH3\_i}$ is selected, and reflected in the calculation of the urea aqueous solution injection amount $Q_{urea}$. The ammonia adsorption amount $S_{NH3\_i}$ per cell indicates the ammonia adsorption ratio (or a coating ratio) of the NOx catalyst 201. In the present embodiment, as the ammonia adsorption amount $S_{NH3\_i}$ at an increasing load operation described later, the ammonia adsorption amount $S_{NH3\_center}$ of the cell 3 positioned at the center in the axial direction of the NOx catalyst 201 is employed.

Figure 4:
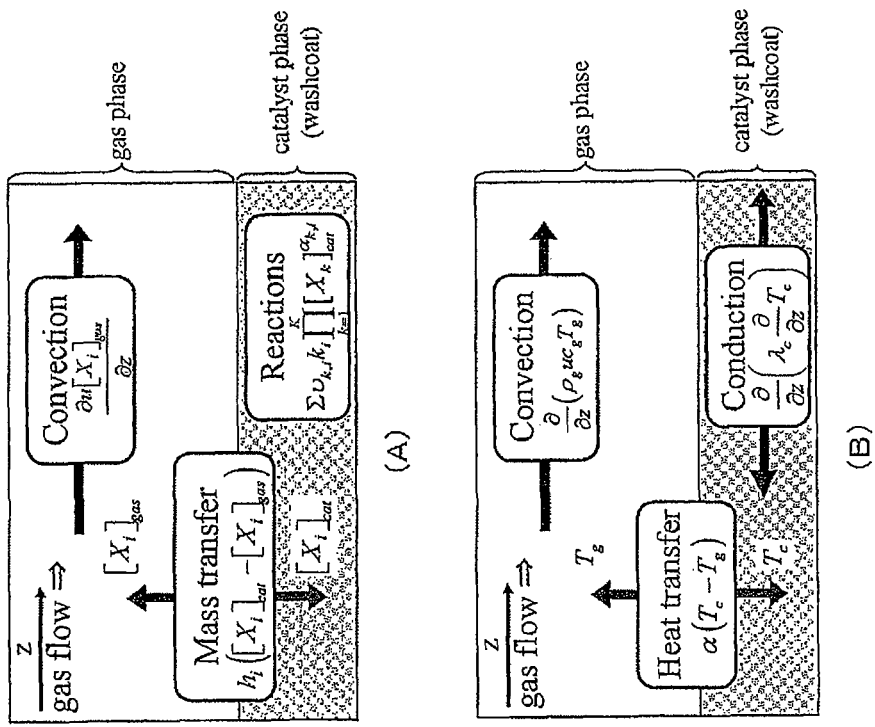
FIG. 4 is an explanatory view of a catalytic reaction model (the first catalytic reaction model) according to the first embodiment.

FIG. 4 is an explanatory view of the SCR catalytic reaction model, and the same diagrams (A) and (B) show a mass balance and an energy balance taken into consideration for each cell under an approximate one-dimensional flow of an axial direction (the z-direction) in the diagrams. The following equation (1) represents the mass balance of chemical species concerned with the reduction of NOx in a gas phase, and the following equation (2) represents the mass balance of the chemical species $X_i$ in a catalyst layer. The following equation (3) represents the energy balance in the gas phase, and the following equation (4) represents the energy balance in the catalyst layer, respectively. In the equations, $[X_i]_{gas}$ and $[X_i]_{cat}$ are concentrations of the chemical species $X_i$ in the gas phase and the catalyst layer, respectively.

[Formula 2]

$$\frac{\partial [X_i]_{gas}}{\partial t} + \frac{\partial u[X_i]_{gas}}{\partial z} = h_i([X_i]_{cat} - [X_i]_{gas})Sv_{gas} \quad (1)$$

[Formula 3]

$$\frac{\partial [X_i]_{cat}}{\partial t} = -h_i([X_i]_{cat} - [X_i]_{gas})Sv_{cat} + \Sigma v_{k,i} k_i \prod_{k=1}^{K} [X_k]_{cat}^{\alpha_{k,i}} \quad (2)$$

[Formula 4]

$$\frac{\partial (\rho_g c_g T_g)}{\partial t} + \frac{\partial (\rho_g u c_g T_g)}{\partial z} = \alpha Sv_{gas}(T_c - T_g) \quad (3)$$

-continued

[Formula 5]

$$\frac{\partial(\rho_c c_c T_c)}{\partial t} = \frac{\partial}{\partial z}\left(\lambda_c \frac{\partial}{\partial z} T_c\right) - \alpha Sv_{gas}(T_c - T_g) \quad (4)$$

The second term of the left side of Equation (1) is a convection term (Convection) of the chemical species $X_i$, and the right side of Equation (1) and the first term of the right side of Equation (2) are mass transfer terms (Mass transfer) of the chemical species $X_i$ between the gas phase and the catalyst layer. $h_i$ is a substance transfer coefficient, and is calculated by the following equation (5). Sv is a specific surface area. The second term of the right side of Equation (2) is a reaction term (Reactions) in the catalyst layer. $v_{k,i}$ and $\alpha_{k,i}$ indicate a difference in stoichiometric ratio between a generation side and a consumption side of chemical species i in a chemical reaction formula k, and a reaction order, respectively. $k_i$ is a reaction velocity constant of the chemical species i which is represented by the following equation (6).

$$h_i = Sh_i \times D_i/dp \quad (5)$$

$$k_i = A\exp\{-E_a/(RT)\} \quad (6)$$

Here, in Equation (5), $Sh_i$ is Sherwood number, $D_i$ is a diffusion coefficient of the chemical species i, and dp is a hydraulic diameter. The diffusion coefficient Di is calculated by Slattery-Bird formula. In Equation (6), A is a reaction frequency factor, $E_a$ is activation energy, and R and T are a gas constant and a temperature, respectively.

The second term of the left side of Equation (3) is a convection term (Convection), and the right side of Equation (3) and the second term of the right side of Equation (4) is a heat transfer term (Heat transfer). The first term of the right side of Equation (4) is a conduction term (Conduction). u is a flow velocity, and $\alpha$, $\rho$, c, T and $\lambda$ are a thermal conductivity, a density, specific heat, a temperature and the thermal conductivity (of the catalyst layer), respectively. Subscripts g and c indicate the gas phase and the catalyst layer, respectively.

The catalytic reaction model according to the present embodiment can be constructed on MATLAB/Simulink.

Figure 5:
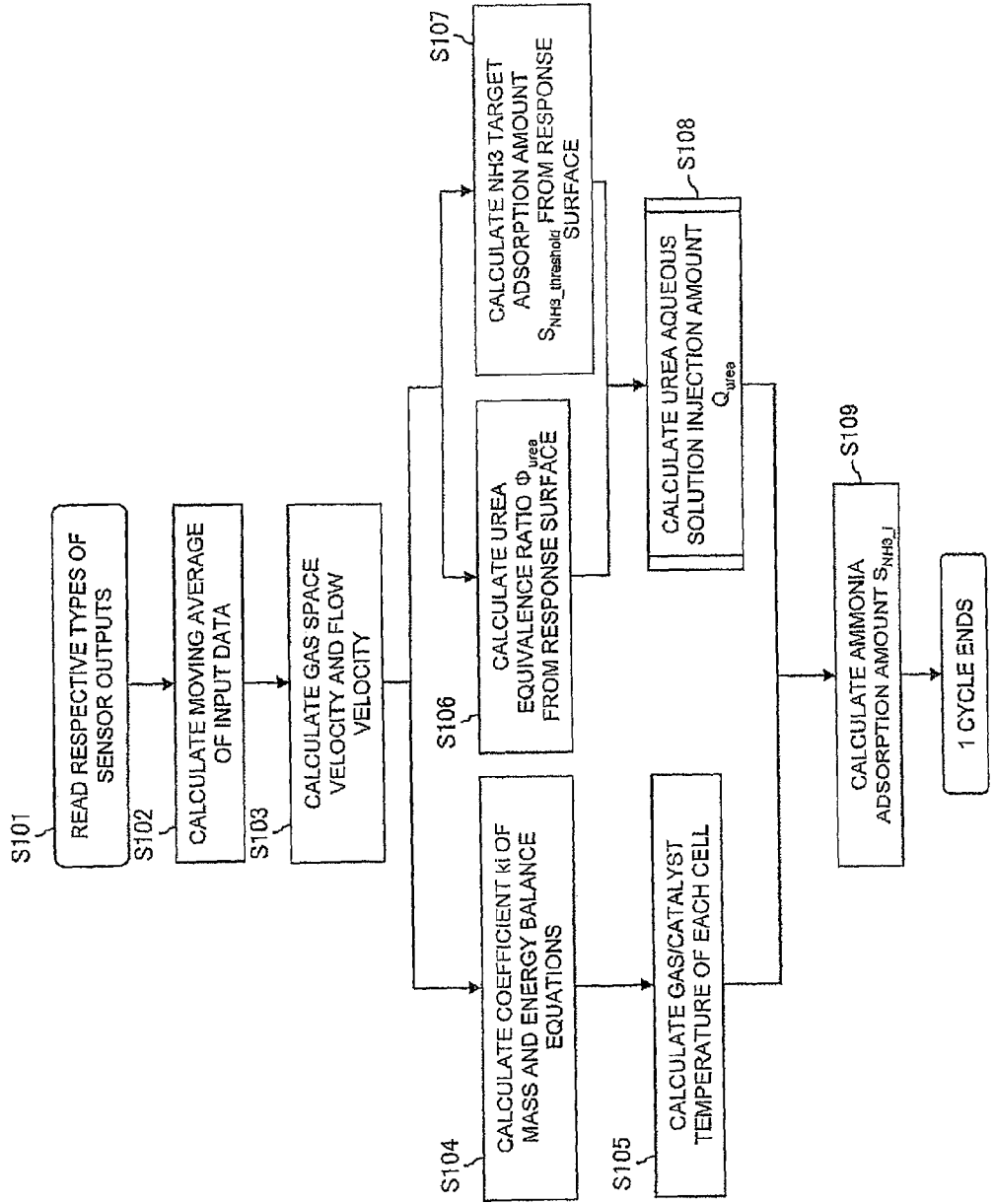
FIG. 5 is a flowchart showing the flow of a basic routine of reducing agent addition control according to the first embodiment.
Figure 6:
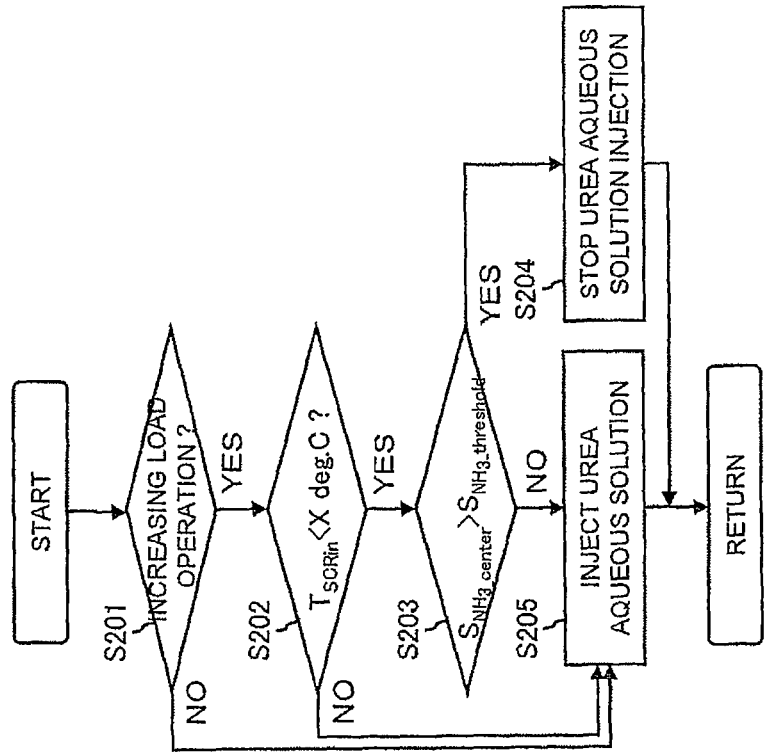
FIG. 6 is a flowchart showing the contents of urea aqueous solution injection amount calculation processing (S108) in the basic routine of FIG. 5.

FIG. 5 is a flowchart showing the flow of a basic routine of reducing agent addition control according to the present embodiment, and FIG. 6 shows the contents of urea aqueous solution injection amount calculation processing (S108) in the basic routine of FIG. 5 in detail.

In S101, types of sensor outputs such as the SCR upstream NOx concentration $NOX_{SCRin}$ are read.

In S102, the ten-points moving average value of the read sensor outputs is calculated.

In S103, the space velocity GHSV of the NOx catalyst 201 is calculated based on the operation state of the engine 1.

In S104, coefficients of a mass balance equation and an energy balance equation are calculated. In the present embodiment, the reaction velocity constant $k_i$ of the mass balance equation (2) is an object, and the coefficient $k_i$ is changed to a larger value on conditions that the temperature of the catalyst layer of the NOx catalyst 201 is high.

In S105, the temperatures of the gas phase and the catalyst layer of each cell are calculated. In the present embodiment, these temperatures are calculated based on the energy balance equations (3) and (4) of the SCR catalytic reaction model by use of a continuous integrating unit of Simulink library. In a simpler method, the temperatures can be calculated by linear interpolation of the sensor outputs, when temperature sensors are arranged on the upstream and downstream sides of the NOx catalyst 201, respectively. Here, the temperature of the gas phase and the temperature of the catalyst layer can be approximated to be equal.

In S106, the urea equivalence ratio $\phi_{urea}$ is calculated from the response surface. In the present embodiment, in processing of S106 and the next S107, a ratio between $NO_2$ and NO in the exhaust gas flowing into the NOx catalyst 201 is set to 1:1.

In S107, the ammonia target adsorption amount $S_{NH3\_threshold}$ is calculated from the response surface.

In S108, the urea aqueous solution injection amount $Q_{urea}$ is calculated from the urea equivalence ratio $\phi_{urea}$, the ammonia target adsorption amount $S_{NH3\_threshold}$ and the ammonia adsorption amount $S_{NH3\_center}$.

In S109, the ammonia adsorption amounts $S_{NH3\_i}$ of the respective cells are calculated by the SCR catalytic reaction model, and the ammonia adsorption amount of the predetermined cell corresponding to the operation state of the engine 1 is selected. In the present embodiment, the calculated ammonia adsorption amount $S_{NH3\_center}$ on the cell 3 positioned at the center of the NOx catalyst 201 in the axial direction among the cells 1 to 5 is selected.

In FIG. 6, it is judged in S201 whether or not the engine 1 is at the increasing load operation. At the increasing load operation, the step advances to S202, and when the engine is not at the increasing load operation, the step advances to S205.

In S202, it is judged whether or not an SCR upstream exhaust temperature $T_{SCRin}$ is lower than a predetermined temperature X deg. C. When the temperature is lower than the predetermined temperature X deg. C., the step advances to S203, and in the other cases, the step advances to S205.

In S203, it is judged whether or not the ammonia adsorption amount $S_{NH3\_center}$ is in excess of the ammonia target adsorption amount $S_{NH3\_threshold}$. When the amount is in excess of the ammonia target adsorption amount $S_{NH3\_threshold}$, the step advances to S204, and in the other cases, the step advances to S205.

In S204, the supply of the urea aqueous solution by the urea aqueous solution injector 202 is stopped.

In S205, the urea aqueous solution injector 202 is driven to supply the urea aqueous solution to the exhaust gas. In the present embodiment, the urea aqueous solution injection amount $Q_{urea}$ is set so that the urea equivalence ratio $\phi_{urea}$ calculated in S106 is obtained with respect to the SCR upstream NOx concentration $NOX_{SCRin}$.

FIGS. 7 to 10 are explanatory views showing functions and effects of the exhaust purification device 2 of the engine according to the present embodiment, and showing the reducing agent addition control (hereinafter referred to especially as "the model base control") according to the present embodiment by comparison with an example where the map is used in the calculation of the NOx emissions (hereinafter referred to especially as "the map control").

In each of comparative experiments, an intercooler turbo (TCI) diesel engine of 9.2 liters displacement was used, an oxidation catalyst of a diameter ($\phi$) 10.5× a length (L) 6 inches was disposed on the upstream side of the NOx catalyst 201 of $\phi$10.5×L4 inches, and a dummy catalyst ($\phi$10.5×L4 inches) to form an exhaust pressure was disposed on the downstream side of the NOx catalyst 201. Then, the operation state of the engine was changed in order of State A: a rotation speed of 80% and a load of 40%, State B: a rotation speed of 80% and a load of 60%, and State C: a rotation speed of 40% and a load of 60%, and changes of evaluation parameters when raising the exhaust temperature stepwise (FIG. 7) were acquired. In the map control, the NOx emissions of the engine were calculated from the operation state of the engine with reference to the map, and an amount of an urea aqueous solution in accordance with the emissions was supplied.

Figure 7:
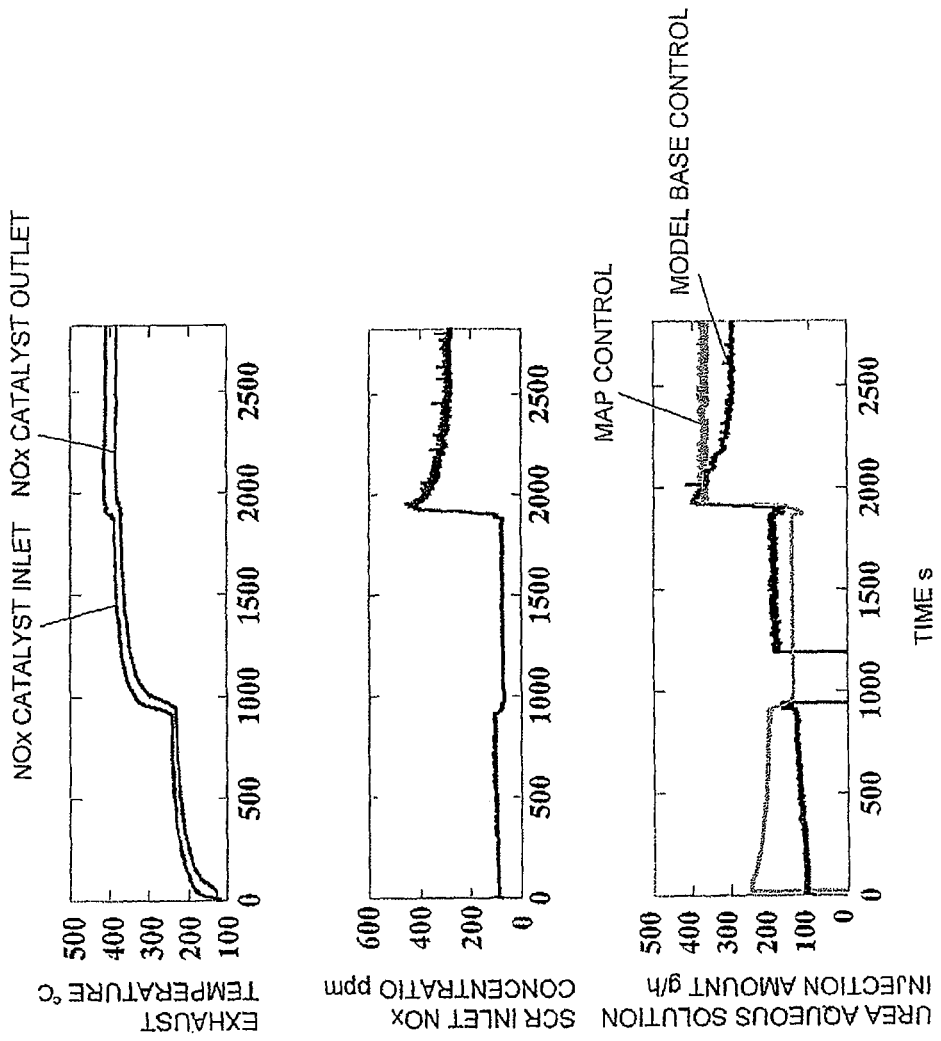
FIG. 7 is an explanatory view of an effect (an urea aqueous solution injection amount) of the first embodiment by comparison with map control.

FIG. 7 shows the urea aqueous solution injection amounts in the model base control and the map control, respectively. In the model base control, the exhaust temperature rises, but the NOx emissions decrease. At a comparatively low-temperature increasing load operation (hereinafter referred to as "at the low-temperature increasing load"), the supply of the urea aqueous solution temporarily stops.

Figure 8:
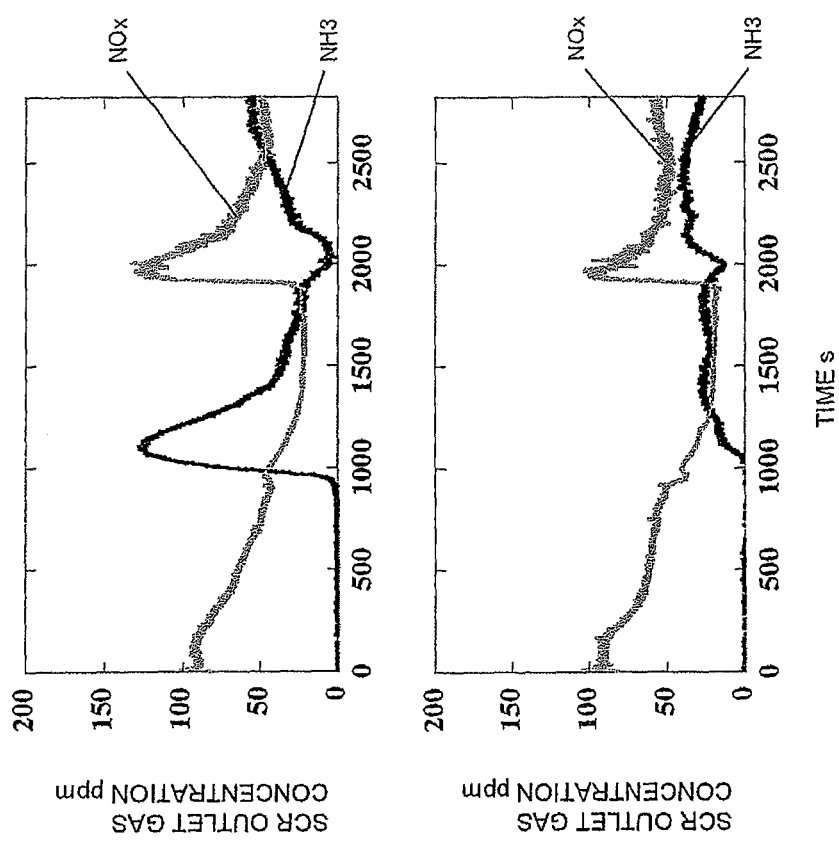
FIG. 8 is an explanatory view of an effect (an SCR outlet gas concentration) of the first embodiment by comparison with the map control.

FIG. 8 shows the concentrations of NOx and ammonia in the vicinity of an outlet of the NOx catalyst 201 in each of the model base control (a lower part of FIG. 8) and the map control (the upper part thereof). In the map control, the urea aqueous solution is continuously supplied also at the low-temperature increasing load, and hence an excessive amount of ammonia is supplied to the NOx catalyst 201, and the ammonia slip occurs. A peak of the ammonia concentrations which appears immediately after 1000 s indicates the occurrence of the ammonia slip. In contrast, when the supply of the urea aqueous solution is stopped at the low-temperature increasing load in the model base control (FIG. 7), the ammonia slip due to the excessive supply of the ammonia can be suppressed. In the present embodiment, NOx discharged from the engine 1 at the low-temperature increasing load is reduced by the ammonia adsorbed on the catalyst layer.

Figure 9:
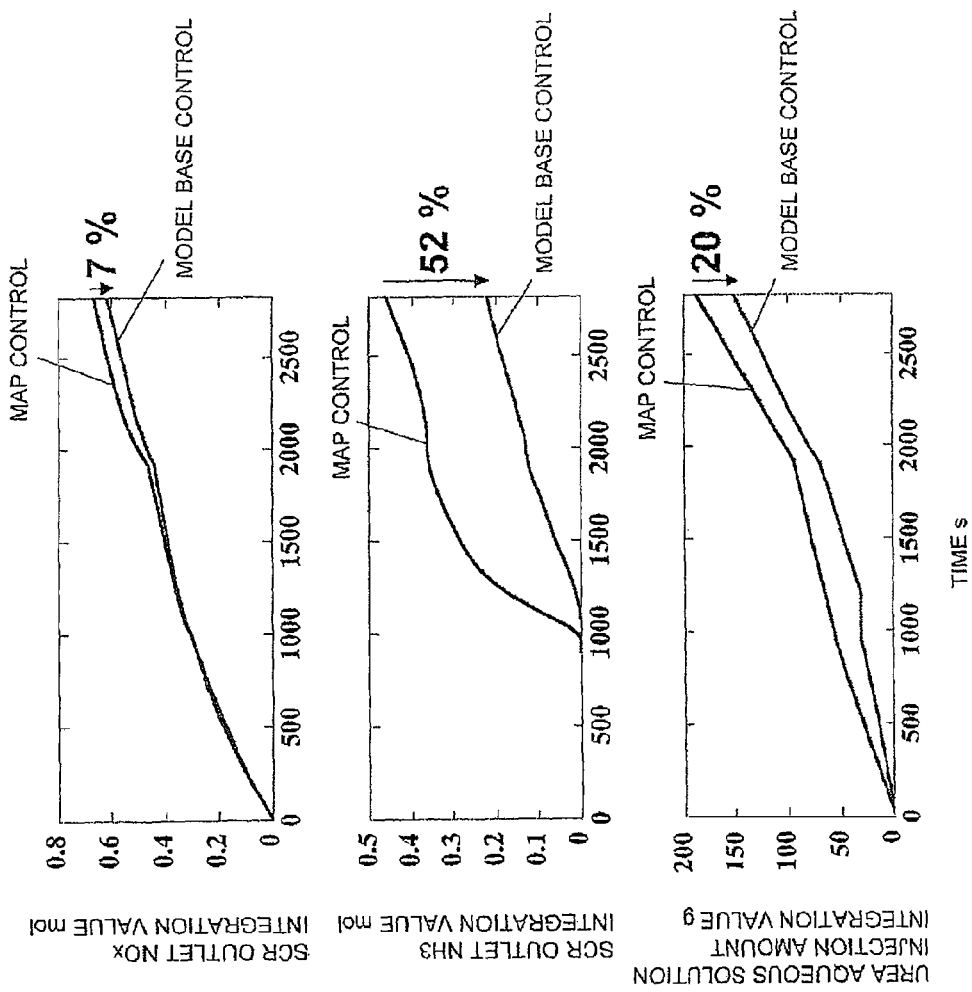
FIG. 9 is an explanatory view of an effect (an SCR outlet NOx integration value, an SCR outlet $NH_3$ integration value, and an urea aqueous solution injection amount integration value) of the first embodiment by comparison with the map control.

FIG. 9 shows an NOx integration value and an ammonia integration value in the vicinity of the outlet of the NOx catalyst 201, and an urea aqueous solution injection amount integration value in each of the model base control and the map control. In the model base control, since the excessive supply of the ammonia is suppressed as already described, the ammonia integration value in the vicinity of the catalyst outlet can noticeably be decreased, and the urea aqueous solution injection amount can be cut down as compared with the map control.

Figure 10:
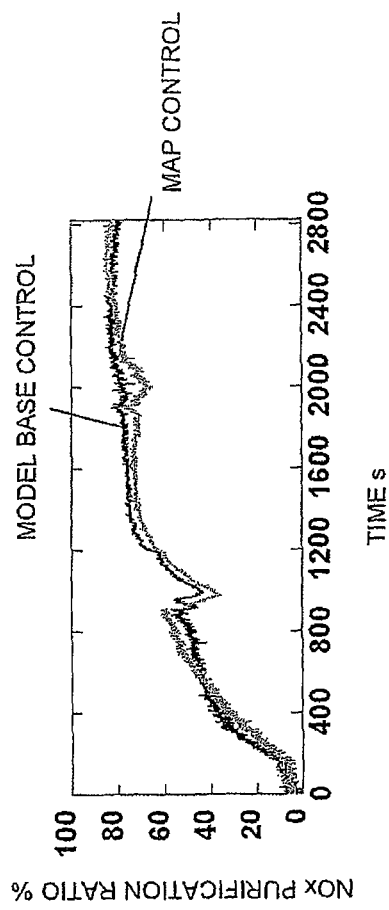
FIG. 10 is an explanatory view of an effect (an NOx purification ratio) of the first embodiment by comparison with the map control.

FIG. 10 shows an NOx purification ratio by the NOx catalyst 201 in each of the model base control and the map control. As a result of the analysis of the NOx purification ratio shown in the same diagram, it has been found that in the model base control, the NOx purification ratio in the mode increases by about 3% as compared with the map control. This means that according to the model base control, not only the ammonia slip is suppressed but also this suppression can be achieved without involving the deterioration of the NOx purification ratio.

Figure 11:
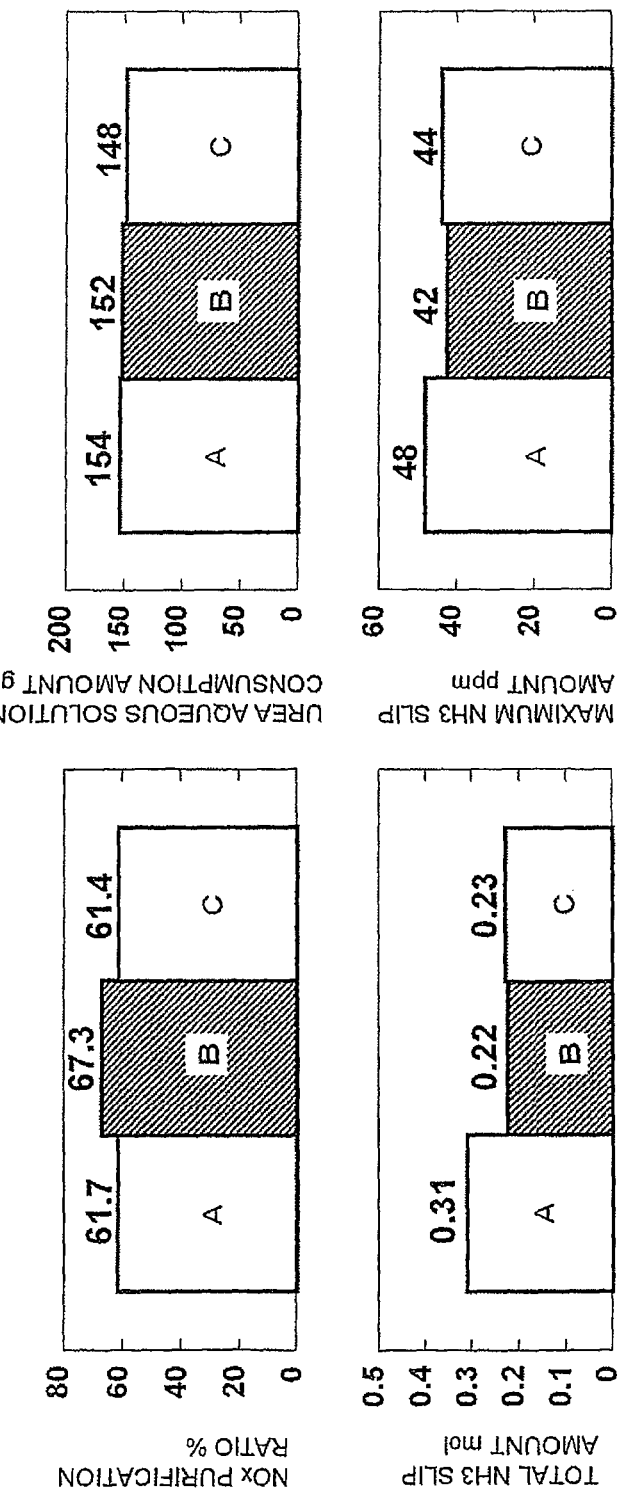
FIG. 11 is a comparison explanatory view of an exhaust purification performance corresponding to the ammonia adsorption amount estimating portion, an ammonia slip amount (Total/Max) and an urea aqueous solution consumption amount.

FIG. 11 shows the NOx purification ratio, a total ammonia slip amount, an urea aqueous solution consumption amount and the maximum ammonia slip amount in the case of the operation of the engine on conditions similar to those of the above comparative experiments, when the selected object of the ammonia adsorption amount $S_{NH3\_i}$ is the front side cell 1 (A), the center cell 3 (B) or the back side cell 5 (C). In this way, it is seen that when the center cell 3 is selected as the selected object at the low-temperature increasing load, the urea aqueous solution consumption amount conforms to the amount when the back side cell 5 is selected, but suitable results can be obtained in the other evaluation parameters.

In the above description, the temperature sensor 212 is disposed on the upstream side of the NOx catalyst 201, and the SCR upstream exhaust temperature detected by this sensor is regarded as an inlet temperature of the NOx catalyst 201. Irrespective of such approximation, heat release from the position of the temperature sensor 212 (a measurement point of the exhaust temperature) to an inlet end surface of the NOx catalyst 201 through the exhaust pipe 101 is taken into consideration, whereby the estimation of the adsorption amount by the SCR catalytic reaction model can more precisely be performed. The following equations (7) and (8) represent a heat release model in this case, and by this model, the exhaust temperature in the catalyst inlet end surface which is closer to the downstream side as much as a distance L than the temperature measurement point is calculated. The following equation (7) represents the energy balance in the gas phase, and the following equation (8) represents the energy balance in the exhaust pipe 101.

$$\partial(\rho_g c_g V_g T_g)/\partial t + \partial(\rho_g u c_g V_g T_g)/\partial z = \alpha_{gp} A_g (T_p - T_g) \quad (7)$$

$$\partial(\rho_p c_p V_p T_p)/\partial t = \alpha_{gp} A_g (T_p - T_g) + \alpha_{pa} A_p (T_a - T_p) \quad (8)$$

$\alpha_{gp} = Nu\lambda/D_1$
$Nu = 0.0027 Re^{0.8} Pr^{0.4}$
$Re = uD_1/\mu$
$Pr = \mu(\rho_g c_g/\lambda_g)$
$A_g = \pi(D_1/4)L$
$A_p = \pi(D_2/4)L$ $a_{gp}$: thermal conductivity between the exhaust gas and the exhaust pipe
$a_{pa}$: thermal conductivity between the exhaust pipe and the outside air
Nu: Nusselt number
Re: Reynolds number
Pr: Prandtl number
$\lambda$: the thermal conductivity of the exhaust pipe
$\lambda_g$: the thermal conductivity of the gas phase
$\mu$: the viscosity of a gas
u: flow velocity
$\rho$: density
c: specific heat
V: volume
T: temperature
$D_1$ and $D_2$: the inner diameter and outer diameter of the exhaust pipe Subscripts g, p and a indicate the gas phase, the exhaust pipe 101 and the outside air, respectively.

Hereinafter, another embodiment of the present invention will be described.

Figure 12:
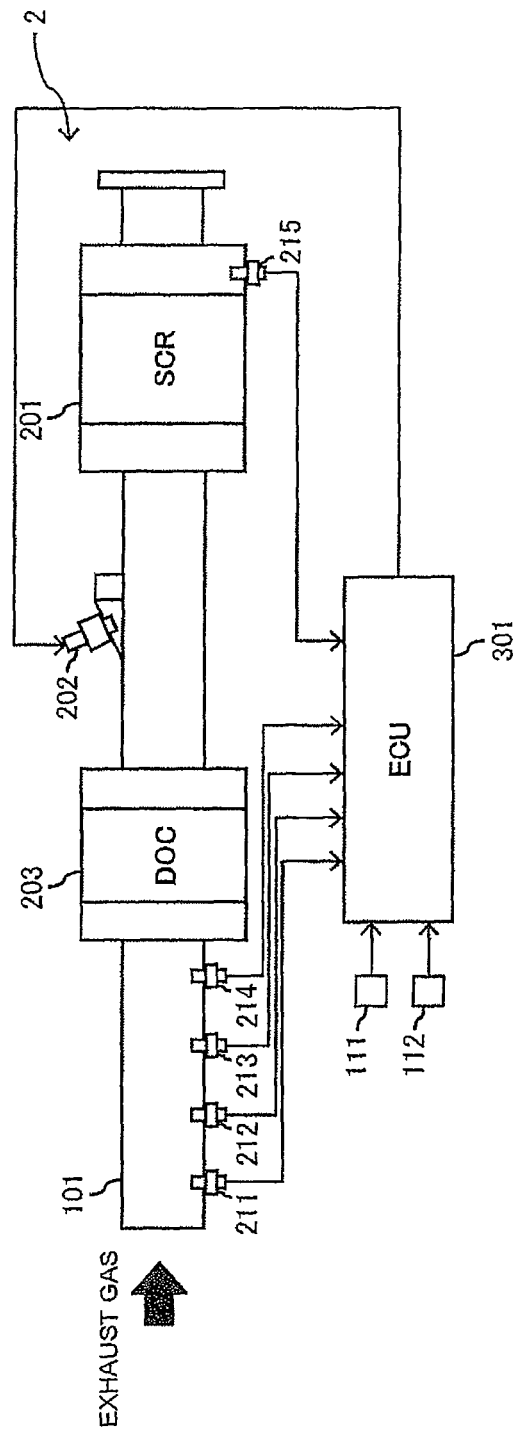
FIG. 12 is a constitutional view of an exhaust purification device of a diesel engine according to a second embodiment of the present invention.

FIG. 12 is a constitutional view of a diesel engine exhaust purification device 2 according to a second embodiment of the present invention. In the following description, constitutional elements similar to those of the first embodiment, for example, the NOx catalyst 201 and the like are denoted with the same reference numerals as in FIG. 1, and redundant description is omitted.

In the present embodiment, along an exhaust pipe 101 of an engine 1, an oxidation catalyst 203 is disposed on an upstream of the NOx catalyst 201, and an urea aqueous solution injector (corresponding to "the reducing agent adding device") 202 is interposed between the NOx catalyst 201 and the oxidation catalyst 203. Part of nitrogen monoxide (NO) in an exhaust gas is converted to nitrogen dioxide ($NO_2$) by the oxidation catalyst 203 to achieve a balance between NO and $NO_2$ in the exhaust gas flowing into the NOx catalyst 201, which is similar to the first embodiment. In the present embodiment, as described later, there is constructed a catalytic reaction model (corresponding to "the second catalytic reaction model", and hereinafter referred to as "the DOC catalytic reaction model") where the oxidation reaction of NO in the oxidation catalyst 203 is numerically formulated, and an $NO_2$ ratio of the exhaust gas flowing into the NOx catalyst 201 is estimated by using this DOC catalytic reaction model, and reflected in the calculation of an amount of ammonia to be supplied to the NOx catalyst 201 (an urea aqueous solution injection amount $Q_{urea}$).

Further in the present embodiment, an NOx sensor 211, a temperature sensor 212, a pressure sensor 213 and an oxygen sensor 214 are arranged on the upstream side of the oxidation catalyst 203, and a pressure sensor 215 is disposed on a downstream side of the NOx catalyst 201. In the present embodiment, the NOx sensor 211 detects an NOx concentration of the exhaust gas in the upstream of the oxidation catalyst 203 (hereinafter referred to as "the DOC inlet NOx concentration"), the temperature sensor 212 detects an exhaust temperature of the upstream of the oxidation catalyst 203 (hereinafter referred to as "the DOC inlet exhaust temperature"), the pressure sensor 213 detects an exhaust pressure of the upstream of the oxidation catalyst 203 (hereinafter referred to as "the DOC inlet exhaust pressure"), and the oxygen sensor 214 detects an oxygen concentration of the exhaust gas in the upstream of the oxidation catalyst 203 (hereinafter referred to as "the DOC inlet oxygen concentration"), respectively. The pressure sensor 215 is attached to a case of the NOx catalyst 201 on the downstream side thereof, and detects a pressure in the vicinity of an outlet of the NOx catalyst 201 (the SCR outlet pressure). Detection signals of the NOx sensor 211, the temperature sensor 212, the pressure sensor 213, the oxygen sensor 214 and the pressure sensor 215 as well as a fuel flow rate and an engine rotation speed detected by operation state sensors 111 and 112 are input into a reducing agent addition control unit (having functions of "the $NO_2$ ratio calculation device" and "the control device" together in the present embodiment, and hereinafter abbreviated to "ECU") 301.

The ECU 301 calculates the amount of the ammonia to be supplied to the NOx catalyst 201 based on the input various sensor outputs, to control the urea aqueous solution injector 202.

Figure 13:
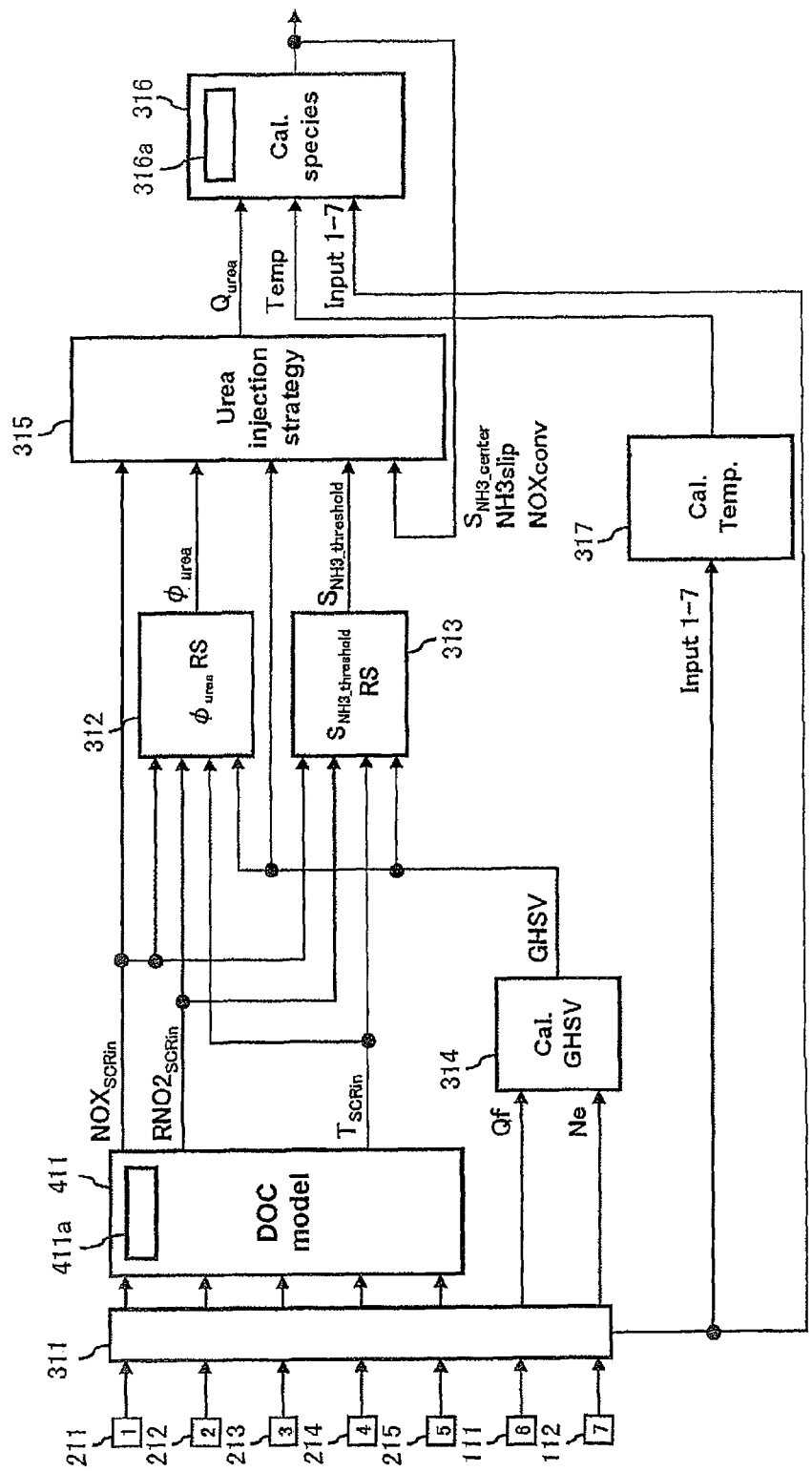
FIG. 13 is a constitutional view of a reducing agent addition control unit according to the second embodiment.

FIG. 13 shows a constitution of the urea aqueous solution addition control unit (ECU) 301 according to the present embodiment by a block diagram.

In the present embodiment, in addition to the calculating of an ammonia adsorption amount $S_{NH3\_i}$ of the NOx catalyst 201 by the SCR catalytic reaction model similarly to the first embodiment, a catalytic reaction model (the DOC catalytic reaction model) where the oxidation reaction of NO in the oxidation catalyst 203 is numerically formulated is incorporated into the control device 301 (an $NO_2$ ratio calculating section 411), and an $NO_2$ ratio $RNO2_{SCRin}$ of the exhaust gas flowing into the NOx catalyst 201 is estimated based on operation conditions of the exhaust purification device 2 by this DOC catalytic reaction model. The calculated $NO_2$ ratio $RNO2_{SCRin}$ is input into an urea equivalence ratio calculating section 312 and an ammonia target adsorption amount calculating section 313, and reflected in the calculation of an urea equivalence ratio $\phi_{urea}$ and an ammonia target adsorption amount $S_{NH3\_threshold}$ in which a response surface is used. In the present embodiment, a molar ratio of $NO_2$ in all NOx in the exhaust gas is "the $NO_2$ ratio".

The $NO_2$ ratio calculating section 411 calculates the $NO_2$ ratio of the exhaust gas passing through the oxidation catalyst 203 by the DOC catalytic reaction model, based on an average value $NOX_{DOCin}$ of DOC inlet NOx concentrations, an average value $T_{DOCin}$ of DOC inlet exhaust temperatures, an average value $P_{DOCin}$ of DOC inlet exhaust pressures, an average value $O2_{DOCin}$ of DOC inlet oxygen concentrations and an average value $P_{SCRout}$ of SCR outlet pressures which are calculated by an average value calculating section 311. In the present embodiment, the DOC catalytic reaction model is stored in a storage section 411a which can be embodied in the form of a nonvolatile memory (e.g., a flash memory) or the like, and the model is read from the storage section 411a by the $NO_2$ ratio calculating section 411 during reducing agent addition control.

The urea equivalence ratio calculating section 312 and the ammonia target adsorption amount calculating section 313 calculate the urea equivalence ratio $\phi_{urea}$ and the ammonia target adsorption amount $S_{NH3\_threshold}$ from the response surface stored beforehand, based on the $NO_2$ ratio $RNO2_{SCRin}$, the NOx concentration of the downstream of the oxidation catalyst 203 (the SCR upstream NOx concentration) $NOX_{SCRin}$ and an exhaust temperature (the SCR upstream exhaust temperature) $T_{SCRin}$ which are calculated by the $NO_2$ ratio calculating section 411, and a space velocity GHSV of the NOx catalyst 201. In the present embodiment, unlike the first embodiment, a term concerning the $NO_2$ ratio is set, in a function of each of the response surfaces of the urea equivalence ratio and the ammonia target adsorption amount.

An urea aqueous solution injection amount calculating section 315 calculates the urea aqueous solution injection amount $Q_{urea}$, based on an ammonia slip amount NH3slip and an NOx purification ratio NOXconv which are calculated by an ammonia adsorption amount calculating section 316 as described later, in addition to the urea equivalence ratio $\phi_{urea}$ and the ammonia target adsorption amount $S_{NH3\_threshold}$ which are calculated by the urea equivalence ratio calculating section 312 and the ammonia target adsorption amount calculating section 313, the ammonia adsorption amount $S_{NH3\_i}$ calculated by the ammonia adsorption amount calculating section 316, the SCR upstream NOx concentration $NOX_{SCRin}$ and the space velocity GHSV. The urea aqueous solution injection amount $Q_{urea}$ is output to the ammonia adsorption amount calculating section 316, whereas the amount is converted to a control instruction signal for the urea aqueous solution injector 202, and output to a drive unit of the urea aqueous solution injector 202.

The ammonia adsorption amount calculating section 316 acquires the SCR catalytic reaction model from a storage section 316a, and calculates the ammonia adsorption amounts $S_{NH3\_i}$ of cells by the acquired SCR catalytic reaction model, based on the urea aqueous solution injection amount $Q_{urea}$ calculated by the urea aqueous solution injection amount calculating section 315, a temperature Temp of a catalyst layer of the NOx catalyst 201 which is calculated by a catalyst temperature calculating section 317 and the respective types of sensor outputs. Similarly to the first embodiment, among the calculated ammonia adsorption amounts $S_{NH3\_i}$, the ammonia adsorption amount $S_{NH3\_i}$ (in the present embodiment, $S_{NH3\_center}$) of the predetermined cell corresponding to the operation state of the engine 1 is input into the urea aqueous solution injection amount calculating section 315, and used in the calculation of the urea aqueous solution injection amount $Q_{urea}$. Further in the present embodiment, in addition to the ammonia adsorption amount $S_{NH3\_i}$, the ammonia slip amount NH3slip and the NOx purification ratio NOXconv are output to the urea aqueous solution injection amount calculating section 315, and used in the calculation of the urea aqueous solution injection amount $Q_{urea}$, together with the ammonia adsorption amount $S_{NH3\_i}$. It is possible to calculate the ammonia slip amount NH3slip as an amount (e.g., the number of moles) of ammonia discharged from the NOx catalyst 201, and the NOx purification ratio NOXconv as, for example, a ratio of a reduced purified content of the NOx catalyst 201 to an amount of NOx flowing into the NOx catalyst 201, respectively, from the estimated result of the ammonia adsorption amount $S_{NH3\_i}$.

In the present embodiment, the $NO_2$ ratio calculating section 411 corresponds to "the $NO_2$ ratio calculating section", the storage section 411*a* corresponds to "the second storage section", the urea equivalence ratio calculating section 312, the ammonia target adsorption amount calculating section 313 and the urea aqueous solution injection amount calculating section 315 correspond to "the ammonia supply amount calculating section", the ammonia adsorption amount calculating section 316 corresponds to "the ammonia adsorption amount calculating section", and the storage section 316*a* corresponds to "the first storage section", respectively.

Here, the DOC catalytic reaction model will be described.

In the present embodiment, there is constructed the catalytic reaction model (the DOC catalytic reaction model) where the oxidation reaction of NO in the oxidation catalyst 203 is numerically formulated. The oxidation reaction of NO in the oxidation catalyst 203 is constituted of the following series of chemical reactions, and in each reaction formula, an adsorbed state on an adsorption site or an active point a of the catalyst layer is represented by attaching a to a molecular symbol of chemical species (e.g., adsorbed NO is represented by σNO).

$$O_2 + 2\sigma \Leftrightarrow 2\sigma O$$

$$NO + \sigma \Leftrightarrow \sigma NO$$

$$NO_2 + \sigma \Leftrightarrow \sigma NO_2$$

$$\sigma NO + \sigma O \Leftrightarrow \sigma NO_2 + \sigma \quad \text{[Formula 6]}$$

Figure 14:
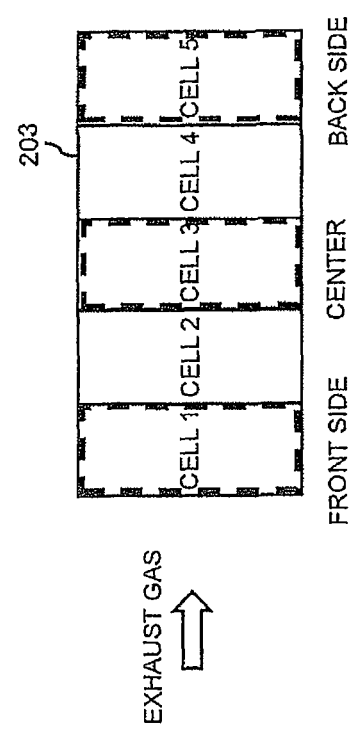
FIG. 14 is an explanatory view of an $NO_2$ ratio calculating portion (cell) of an oxidation catalyst according to the second embodiment.

Further in the present embodiment, as shown in FIG. 14, the inside of the oxidation catalyst 203 is divided into a plurality of cells (cells 1 to 5 in the present embodiment) which are continuously aligned in an axial direction of the catalyst, and an NO$_2$ ratio RNO2$_i$ (i=1 to 5) of the exhaust gas passing through each of these cells 1 to 5 is calculated by using the DOC catalytic reaction model. Then, the calculated NO$_2$ ratio RNO2$_5$ through the cell 5 positioned on the most downstream side is output, as the NO$_2$ ratio RNO2$_{SCRin}$ of the exhaust gas flowing into the NOx catalyst 201, to the urea equivalence ratio calculating section 312 and the ammonia target adsorption amount calculating section 313, and reflected in the calculation of the urea equivalence ratio $\phi_{urea}$ and the ammonia target adsorption amount S$_{NH3\_threshold}$.

Figure 15:
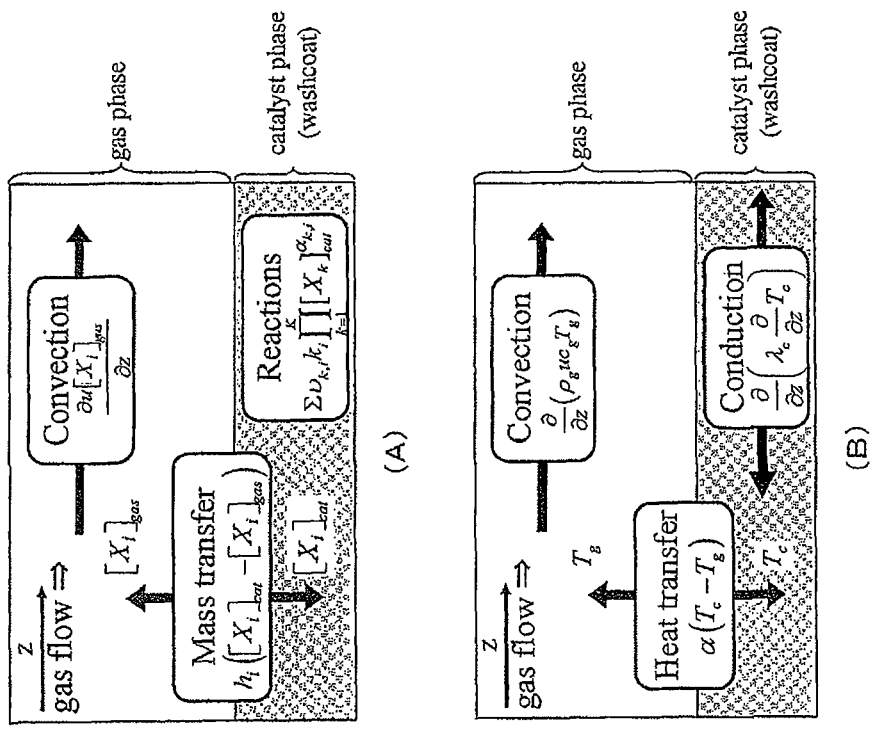
FIG. 15 is an explanatory view of a catalytic reaction model (a second catalytic reaction model) according to the second embodiment.

FIG. 15 is an explanatory view of the DOC catalytic reaction model, and the same diagrams (A) and (B) show a mass balance and an energy balance taken into consideration for each cell under an approximate one-dimensional flow of an axial direction (the z-direction) in the diagrams. The following equation (5) represents the mass balance in a gas phase of chemical species X$_i$ concerned with the oxidation reaction in the oxidation catalyst 203, and the following equation (6) represents the mass balance in a catalyst layer of the chemical species X$_i$. The following equation (7) represents the energy balance in the gas phase, and the following equation (8) represents the energy balance in the catalyst layer, respectively. In the equations, [X$_i$]$_{gas}$ and [X$_i$]$_{cat}$ are concentrations of the chemical species X$_i$ in the gas phase and the catalyst layer, respectively.

[Formula 7]

$$\frac{\partial [X_i]_{gas}}{\partial t} + \frac{\partial u[X_i]_{gas}}{\partial z} = h_i([X_i]_{cat} - [X_i]_{gas})Sv_{gas} \quad (5)$$

[Formula 8]

$$\frac{\partial [X_i]_{cat}}{\partial t} = -h_i([X_i]_{cat} - [X_i]_{gas})Sv_{cat} + \Sigma v_{k,i} k_i \prod_{k=1}^{K} [X_k]_{cat}^{\alpha_{k,i}} \quad (6)$$

[Formula 9]

$$\frac{\partial (\rho_g c_g T_g)}{\partial t} + \frac{\partial (\rho_g u c_g T_g)}{\partial z} = \alpha Sv_{gas}(T_c - T_g) \quad (7)$$

[Formula 10]

$$\frac{\partial (\rho_c c_c T_c)}{\partial t} = \frac{\partial}{\partial z}\left(\lambda_c \frac{\partial}{\partial z} T_c\right) - \alpha Sv_{gas}(T_c - T_g) \quad (8)$$

Significances of terms of Equations (5) to (8) and variables in the equations are the same as in Equations (1) to (4) concerning the SCR catalytic reaction model, and the DOC catalytic reaction model can be constructed on MATLAB/Simulink.

The equations of the SCR catalytic reaction model which are employed in the present embodiment are similar to Equations (1) to (4) of the first embodiment, but in the present embodiment, the NO$_2$ ratio RNO2$_{SCRin}$ of the exhaust gas flowing into the NOx catalyst 201 can be estimated, and hence in addition to the above four reactions taken into consideration as the chemical reactions concerned with the reduction of NOx in the first embodiment, reactions represented by the following three formulas are taken into consideration. In consequence, it is possible to reproduce a change of a reaction amount corresponding to the actual ratio of NO$_2$ to NO, in the calculation of the ammonia adsorption amount S$_{NH3\_i}$.

$$2NO + O_2 \Leftrightarrow 2NO_2$$

$$4NO + O_2 + 4\sigma NH_3 \rightarrow 4N_2 + 6H_2O$$

$$6NO_2 + 8\sigma NH_3 \rightarrow 7N_2 + 12H_2O \quad \text{[Formula 11]}$$

In addition, one of the following six formulas, or any combination or all of them can be taken into consideration.

$$(NH_2)_2CO \rightarrow NH_3 + HNCO$$

$$HNCO + H_2O \rightarrow NH_3 + CO_2$$

$$2NO_2 + 2\sigma NH_3 \rightarrow N_2O + N_2 + 3H_2O$$

$$3N_2O + 2\sigma NH_3 \rightarrow 4N_2 + 3H_2O$$

$$NO_2 + \sigma \Leftrightarrow \sigma NO_2$$

$$2NO + 2\sigma NO_2 + 4\sigma NH_3 \rightarrow 4N_2 + 6H_2O \quad \text{[Equation 12]}$$

Figure 16:
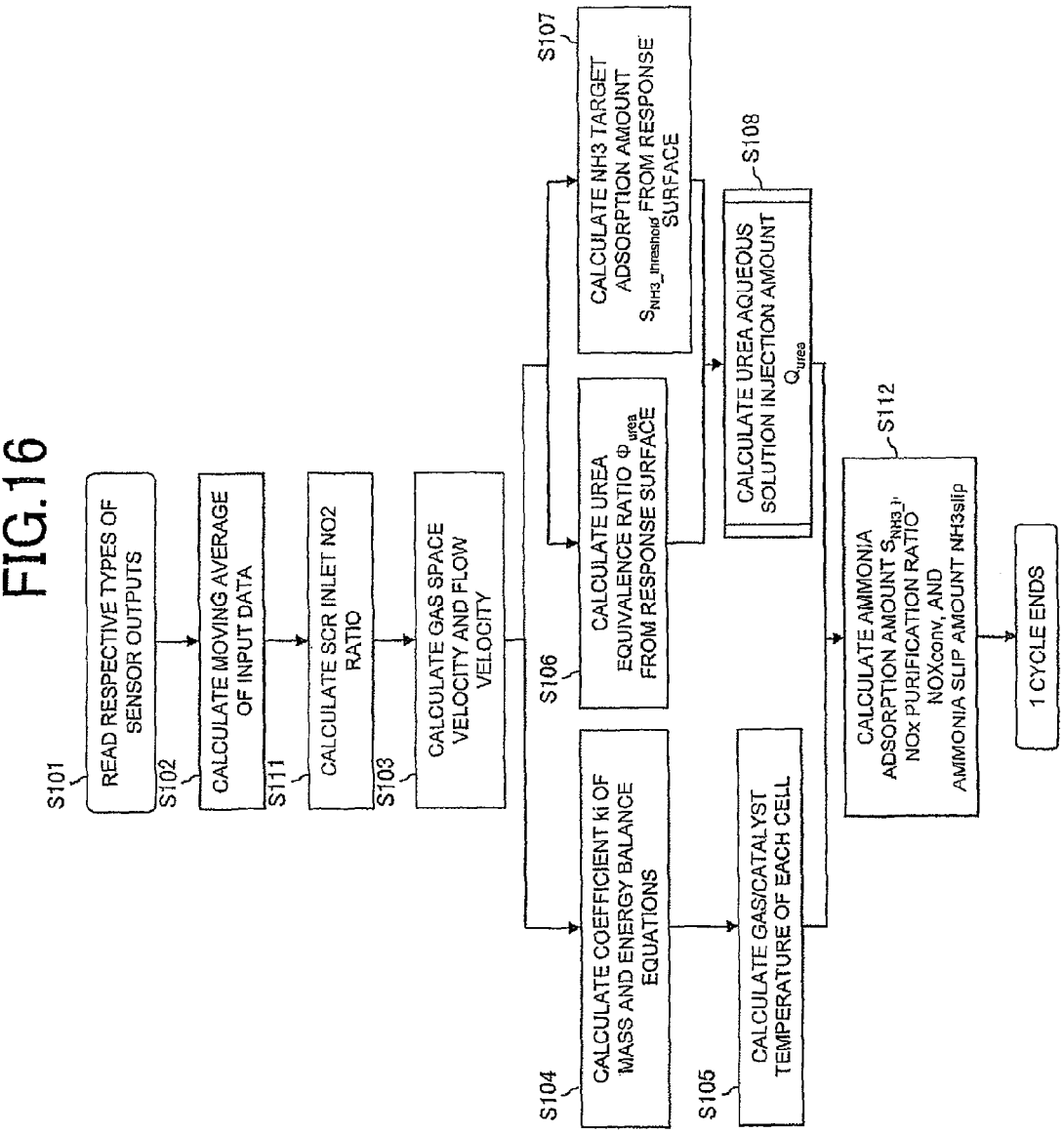
FIG. 16 is a basic flowchart showing the flow of a basic routine of reducing agent addition control according to the second embodiment.
Figure 17:
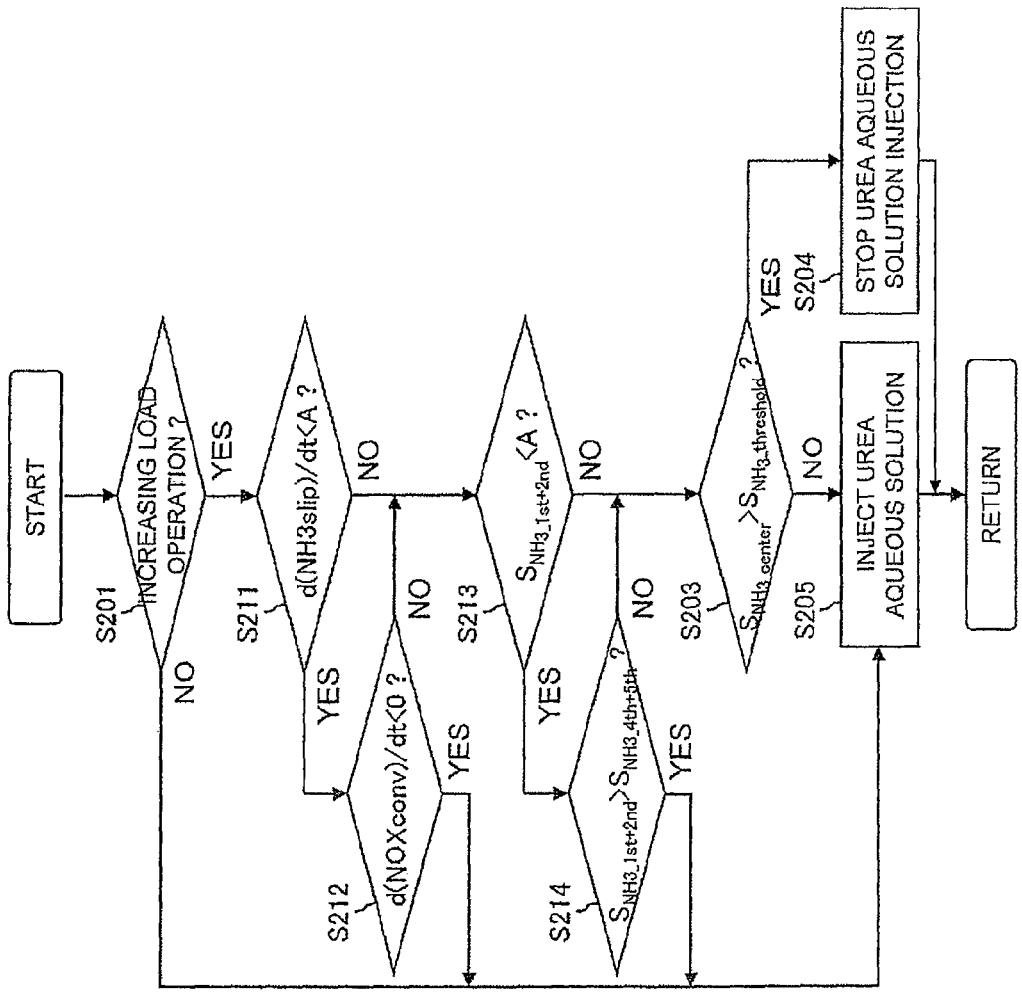
FIG. 17 is a flowchart showing the contents of urea aqueous solution injection amount calculation processing (S108) in the basic routine of FIG. 16.

FIG. 16 is a flowchart showing the flow of a basic routine of reducing agent addition control according to the present embodiment, and FIG. 17 shows the contents of urea aqueous solution injection amount calculation processing (S108) in the basic routine of FIG. 16 in detail.

In S101, types of sensor outputs such as the DOC inlet NOx concentration NOX$_{DOCin}$ are read.

In S102, a ten-points moving average value of the read sensor outputs is calculated.

In S111, the SCR inlet NO$_2$ ratio RNO2$_{SCRin}$ is calculated. In the present embodiment, the NO$_2$ ratio of the exhaust gas passing through each of the cells 1 to 5 (FIG. 14) is calculated by the DOC catalytic reaction model, and the calculated NO$_2$ ratio of the exhaust gas passing through the cell 5 positioned on the most downstream side among the cells 1 to 5 is obtained as the SCR inlet NO$_2$ ratio RNO2$_{SCRin}$.

In S103, the space velocity GHSV of the NOx catalyst 201 is calculated based on the operation state of the engine 1.

In S104, coefficients $k_i$ of a mass balance equation and an energy balance equation are calculated.

In S105, the temperatures of the gas phase and the catalyst layer of each of the cells 1 to 5 are calculated. These temperatures can be calculated based on the energy balance equations (7) and (8) of the DOC catalytic reaction model by use of a continuous integrating unit of Simulink library. When a temperature sensor is also disposed on the downstream side of the oxidation catalyst 203 in addition to the temperature sensor 212, the temperatures may be calculated by the linear interpolation of the sensor outputs. Here, the temperature of the gas phase and the temperature of the catalyst layer can be approximated to be equal.

In S106, the urea equivalence ratio $\phi_{urea}$ is calculated from the response surface. In the present embodiment, a term concerning the $NO_2$ ratio is set to a function of the response surface, and in processing of S106 and the next S107, the $NO_2$ ratio (the SCR inlet $NO_2$ ratio $RNO2_{SCRin}$) calculated in S111 is applied.

In S107, the ammonia target adsorption amount $S_{NH3\_threshold}$ is calculated from the response surface.

In S108, the urea aqueous solution injection amount $Q_{urea}$ is calculated from the urea equivalence ratio $\phi_{urea}$, the ammonia target adsorption amount $S_{NH3\_threshold}$, the ammonia adsorption amount $S_{NH3\_center}$, the ammonia slip amount NH3slip and the NOx purification ratio NOXconv.

In S112, the ammonia adsorption amounts $S_{NH3\_i}$ of the respective cells 1 to 5 are calculated by the SCR catalytic reaction model, and the ammonia adsorption amount $S_{NH3\_center}$ of the predetermined cell corresponding to the operation state of the engine 1 (in the present embodiment, the center cell 3 in the axial direction shown in FIG. 3) is selected. Further In the present embodiment, the ammonia slip amount NH3slip and the NOx purification ratio NOXconv are calculated.

In FIG. 17, it is judged in S201 whether or not the engine 1 is at an increasing load operation. At the increasing load operation, the step advances to S211, and when the engine is not at the increasing load operation, the step advances to S205.

In S211, it is judged whether or not the ammonia slip amount NH3slip decreases. In the present embodiment, a change amount (=d(NH3slip)/dt) of the ammonia slip amount NH3slip per unit time is calculated, to judge whether or not this amount is smaller than 0, but it may simply be judged whether or not the ammonia slip amount NH3slip at the present time is smaller than the ammonia slip amount before predetermined time (e.g., an ammonia slip amount $NH3slip_{n-1}$ at the previous control execution). When a vibration is present in the ammonia slip amount NH3slip and it is difficult to compare the amounts simply between two times, moving average values (e.g., simple moving average values) at times t1 and t2 may be employed as ammonia slip amounts $NH3slip_{t1}$ and $NH3slip_{t2}$ at the respective times. For example, it is judged whether or not a value obtained by dividing, by time $\Delta t(=t2-t1)$, a difference ($=NH3slip_{t2}-NH3slip_{t1}$) between the moving average values of the ammonia slip amounts at the two consecutive times t1 and t2 is smaller than 0. In the processing of S211, when the ammonia slip amount NH3slip decreases, the step advances to S212, and in the other cases, the step advances to S213.

It is judged in S212 whether or not the NOx purification ratio NOXconv lowers. Similarly to S211, it may be judged whether or not the change amount (=d(NOXconv)/dt) of the NOx purification ratio NOXconv per unit time is smaller than 0, or for the sake of simplicity, it may be judged whether or not the NOx purification ratio NOXconv at the present time is lower than the NOx purification ratio before the predetermined time (e.g., the NOx purification ratio $NOXconv_{n-1}$ at the previous control execution). When the ratio lowers, the step advances to S205, and in the other cases, the step advances to S213. It is possible to suitably employ the moving average value of the NOx purification ratios in the same manner as described above.

Thus, in the present embodiment, when it is detected that both the ammonia slip amount NH3slip and the NOx purification ratio NOXconv decrease or lower by the processing of S211 and 212 after stopping the supply of the urea aqueous solution to the exhaust gas at the increasing load operation (S204), the processing advances to S205 to restart the supply of the urea aqueous solution. In consequence, it is possible to avoid the excessive lowering of the NOx purification ratio while suppressing the increase of the ammonia slip amount.

In S213, it is judged whether or not a total value (represented by "the ammonia adsorption amount $S_{NH3\_1st+2nd}$") of the ammonia adsorption amounts of the cells positioned on the upstream side of the NOx catalyst 201 (in the present embodiment, the cells 1 and 2) is smaller than a predetermined valve A. When the value is smaller, the step advances to S214, and in the other cases, the step advances to S203.

In S214, it is judged whether or not the total value $S_{NH3\_1st+2nd}$ of the ammonia adsorption amounts of the cells positioned on the upstream side of the NOx catalyst 201 (in the present embodiment, the cells 1 and 2) is larger than a total value (represented by "the ammonia adsorption amount $S_{NH3\_4th+5th}$" of the ammonia adsorption amounts of the cells positioned on the downstream side (in the present embodiment, the cells 4 and 5). When the value is larger, the step advances to S205, and in the other cases, the step advances to S203.

In S203, it is judged whether or not the ammonia adsorption amount $S_{NH3\_center}$ is in excess of the ammonia target adsorption amount $S_{NHL3\_threshold}$. When the amount is in excess of the ammonia target adsorption amount $S_{NH3\_threshold}$, the step advances to S204, and in the other cases, the step advances to S205.

In S204, the supply of the urea aqueous solution by the urea aqueous solution injector 202 is stopped.

In S205, the urea aqueous solution injector 202 is driven to supply the urea aqueous solution to the exhaust gas. Similarly to the first embodiment, the urea aqueous solution injection amount $Q_{urea}$ is set so that the urea equivalence ratio $\phi_{urea}$ calculated in S106 is obtained with respect to the SCR upstream NOx concentration $NOX_{SCRin}$.

Here, the processing of S213 and S214 shown in FIG. 17 will be described with reference to FIG. 18 and FIG. 19.

Figure 18:
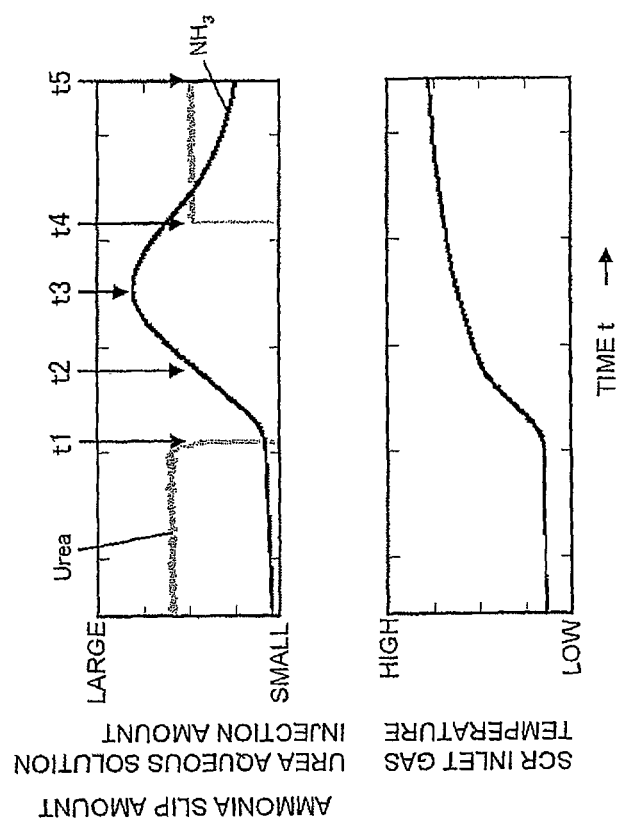
FIG. 18 is an explanatory view showing an example of an operation of the exhaust purification device according to the second embodiment at an increasing load operation.
Figure 19:
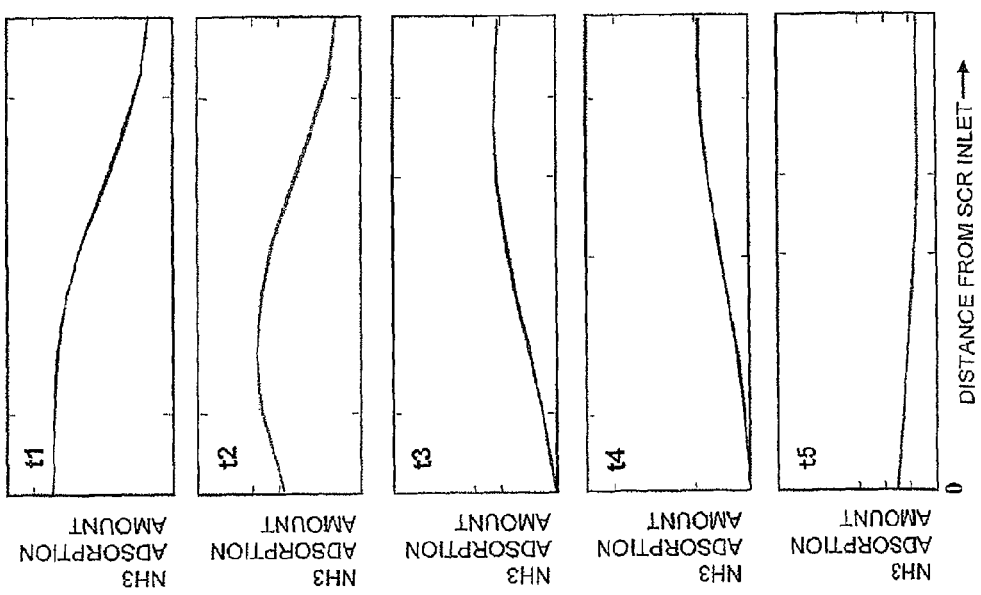
FIG. 19 is an explanatory view showing an example of a change with time in an axial distribution of ammonia adsorption amounts at the increasing load operation.

FIG. 18 shows an operation of the exhaust purification device 2 according to the present embodiment at the increasing load operation of the engine 1, and FIG. 19 shows a change with time in an axial distribution of the ammonia adsorption amounts at the increasing load operation in accordance with time t1 to t5 shown in FIG. 18.

As shown in FIG. 18, at the increasing load operation of the engine 1, the ammonia slip amount increases, as an exhaust temperature (the SCR inlet gas temperature $T_{SCRin}$) rises. This is supposedly because the desorption of the adsorbed ammonia from the catalyst layer becomes active owing to the temperature rise. In the present embodiment, the urea aqueous solution is positively supplied on such high-temperature conditions as to activate the reduction of NOx in the NOx catalyst 201, but especially in a period when the ammonia slip steeply occurs (a period of the time t1 to t4 shown in FIG. 18), the supply of the urea aqueous solution by the urea aqueous solution injector 202 is stopped, to prevent the excessive supply of the urea aqueous solution.

Here, according to FIG. 19, it is seen that owing to the rise of the exhaust temperature, the distribution of the adsorbed ammonia on the NOx catalyst 201 shifts from an inlet-side uneven distribution type (inlet-side adsorption, time t1 to t2) to an outlet-side uneven distribution type (outlet-side adsorption, time t3 to t4), and in the shift period (t1 to t4) of this distribution configuration, the occurrence of the ammonia slip becomes steep. Therefore, as one of conditions on which the supply of the urea aqueous solution is restarted, it is necessary to consider that the distribution of the adsorbed ammonia is the inlet-side uneven distribution type (e.g., $S_{NH3\_1st+2nd} > S_{NH3\_4th+5th}$ of FIG. 17). Here, it is considered that the distribution configuration is the inlet-side uneven distribution type even in the period of time t1 to t2 immediately after the start of the increasing load operation (e.g., $S_{NH3\_1st+2nd} < A$ of FIG. 17).

Thus, according to the processing of S213 and S214, the supply of the urea aqueous solution stops in the period when the ammonia slip steeply occurs owing to the temperature rise, and it is possible to suppress the increase of the ammonia slip amount due to the excessive supply of the urea aqueous solution. Especially in the present embodiment, unlike a case where the only rise of the exhaust temperature is simply monitored to judge whether to stop or restart the supply of the urea aqueous solution, the deterioration of the NOx purification ratio due to frequent switching can be prevented, and it is also possible to cope with a case where the exhaust temperature rapidly rises. For example, at time t2 shown in FIG. 19, the ammonia slip steeply occurs owing to the temperature rise (the ammonia slip amount is increasing), but the distribution of the adsorbed ammonia maintains the inlet-side uneven distribution type. This is because delay in the temperature rise is present in the shift of the distribution configuration from the inlet-side uneven distribution type to the outlet-side uneven distribution type. In the judgment only by the temperature, the supply of the urea aqueous solution is restarted at the time t2 owing to the rapid temperature rise, but in the present embodiment, it is possible to avoid such judgment as to further promote the ammonia slip.

Figure 20:
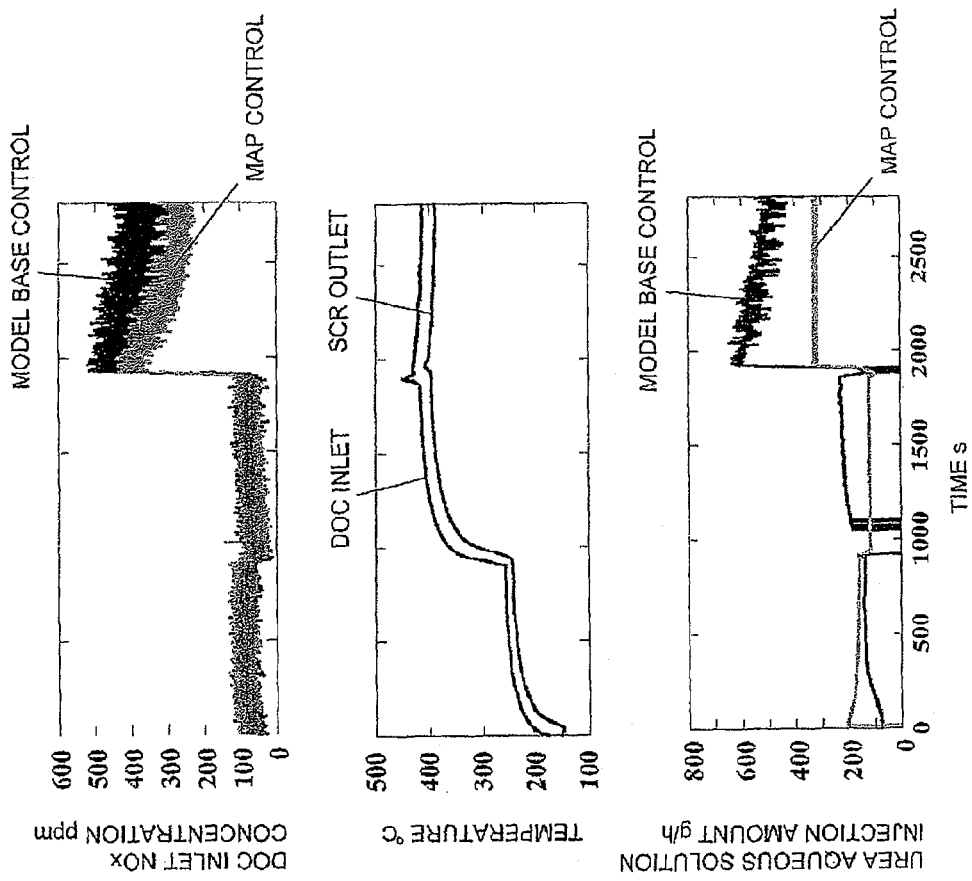
FIG. 20 is an explanatory view of an effect (an urea aqueous solution injection amount) of the second embodiment by comparison with map control.
Figure 21:
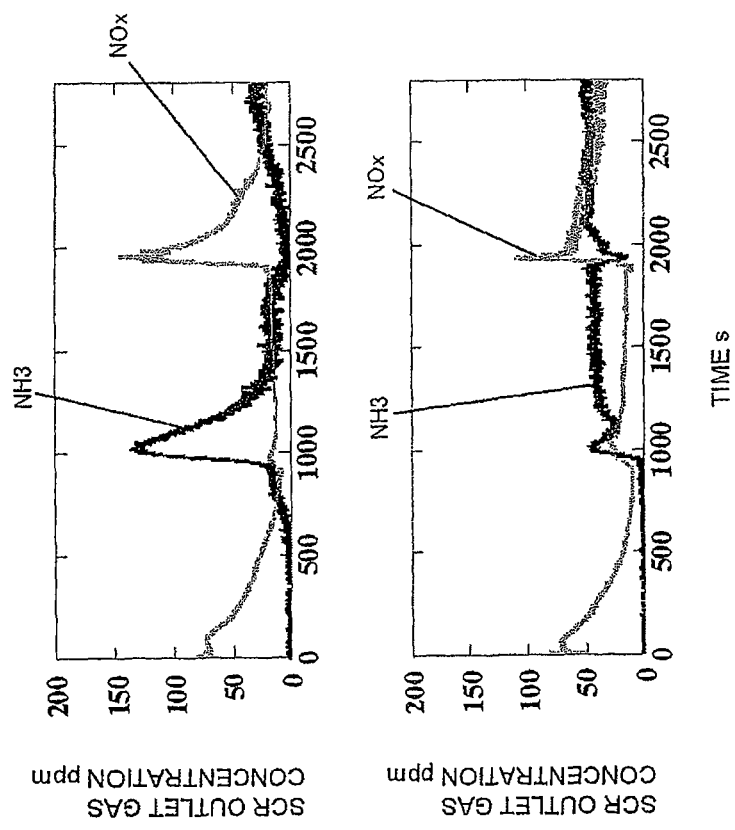
FIG. 21 is an explanatory view of an effect (an SCR outlet gas concentration) of the second embodiment by comparison with the map control.
Figure 22:
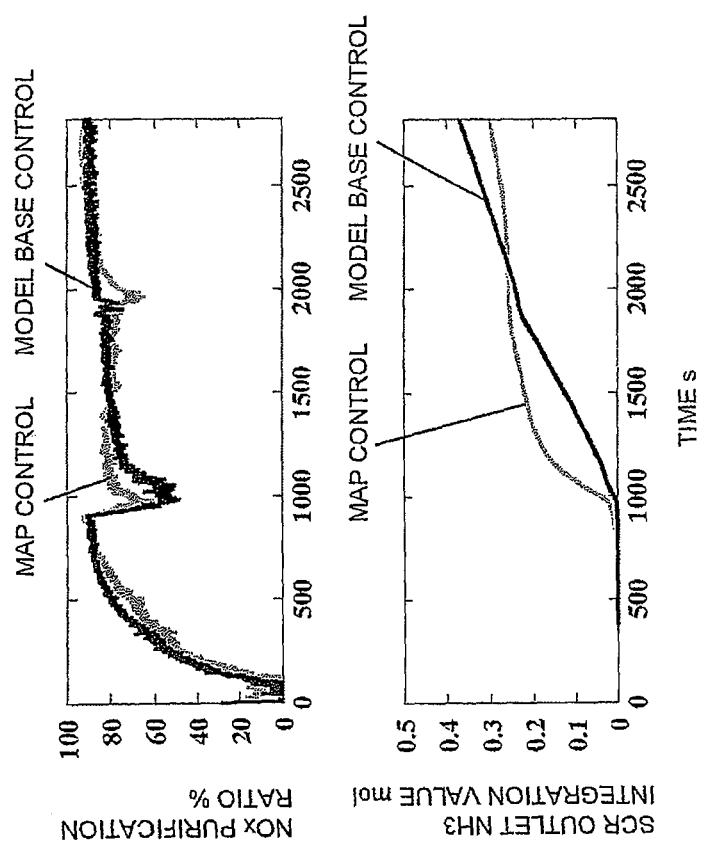
FIG. 22 is an explanatory view of an effect (an NOx purification ratio, and an SCR outlet $NH_3$ integration value) of the second embodiment by comparison with the map control.

FIGS. 20 to 22 are explanatory views showing functions and effects of the exhaust purification device 2 of the engine according to the present embodiment, and showing the reducing agent addition control (model base control) according to the present embodiment by comparison with an example where a map is used in the calculation of NOx emissions (map control).

In each of comparative experiments, similarly to the first embodiment, an intercooler turbo (TCI) diesel engine of 9.2 liters displacement was used, an oxidation catalyst of a diameter (φ) 10.5×a length (L) 6 inches was disposed on the upstream side of the NOx catalyst 201 of φ10.5×L4 inches, and a dummy catalyst (φ10.5×L4 inches) to form an exhaust pressure was disposed on the downstream side of the NOx catalyst 201. Then, the operation state of the engine was changed in order of State A: a rotation speed of 80% and a load of 40%, State B: a rotation speed of 80% and a load of 60%, and State C: a rotation speed of 40% and a load of 60%, and changes of evaluation parameters when raising the exhaust temperature stepwise (FIG. 20) were acquired. In the map control, the NOx emissions of the engine were calculated from the operation state of the engine with reference to the map, and an amount of urea aqueous solution in accordance with the emissions was supplied to the exhaust gas.

FIG. 20 shows changes of a DOC inlet NOx concentration, exhaust temperatures (a DOC inlet exhaust temperature and an SCR outlet exhaust temperature) and an urea aqueous solution injection amount in accordance with the transition of the operation state in each of the model base control and the map control. As shown in the same diagram, in the model base control, the supply of the urea aqueous solution temporarily stops at the increasing load operation from the state A to the state B, and the urea aqueous solution injection amount after the restart of the supply increases as compared with the map control.

FIG. 21 shows the concentrations of NOx and ammonia in the vicinity of an outlet of the NOx catalyst 201 in each of the model base control (a lower part of FIG. 21) and the map control (the upper part thereof). In the model base control, the supply of the urea aqueous solution is temporarily stopped at the increasing load operation (FIG. 20), whereby the ammonia slip which immediately and remarkably occurs after 1000 seconds (s) in the map control is suppressed. Additionally, in the present embodiment, the increase of the NOx concentration (the SCR outlet NOx concentration) which occurs at deceleration from the state B to the state C around 2000 s is suppressed as compared with the map control. This is supposedly because the ammonia adsorption amount $S_{NH3\_i}$ on the NOx catalyst 201 is accurately grasped so that more suitable amount of the ammonia can be added to the exhaust gas, whereby it is possible to acquire such a sufficient amount of the adsorbed ammonia as to cope with the increase of the NOx emissions during the deceleration until the state shifts to the state C.

FIG. 22 shows an NOx purification ratio and an ammonia integration value (the SCR outlet $NH_3$ integration value) in the vicinity of the outlet of the NOx catalyst 201 in each of the model base control and the map control. According to experiment results shown in the same diagram, concerning the model base control, a decreasing effect is seen in the SCR outlet $NH_3$ integration value at the increasing load operation. This is considered to result from the suppression of the ammonia slip immediately after the increase of the load. Furthermore, from the analysis of the NOx purification ratio shown in the upper part, there has been obtained the conclusion that according to the model base control, the NOx purification ratio increases by about 2% all through the experiment time. Thus, according to the present embodiment, it is possible to increase the NOx purification ratio while suppressing the ammonia slip. Here, after 2000 s, reversal occurs in the SCR outlet $NH_3$ integration value between the model base control and the map control. As shown in FIG. 20, in the model base control, the NOx emissions (the DOC inlet NOx concentration) noticeably increase in accordance with the shift to the state C, whereas the urea aqueous solution injection amount accordingly increases (this increase of the NOx emissions is caused by characteristics of the engine under test, and is not an originally intended increase), which might promote the increase of the SCR outlet $NH_3$ integration value.

The present invention is not limited to the above-mentioned urea SCR, and can be applied to a combination of a diesel particulate filter (DPF) and an NOx catalyst system, or a DPF catalyst system coated with an NOx catalyst layer.

In the above description, the preferable embodiments of the present invention have been described, but the scope of the present invention is not limited to the above description, and is judged based on the description of claims in accordance with an applicable provision.

DESCRIPTION OF REFERENCE MARKS

1 . . . diesel engine, 101 . . . exhaust pipe, 111 . . . fuel flow rate sensor, 112 . . . engine rotation speed sensor, 2 . . . exhaust purification device, 201 . . . NOx catalyst, 202 . . . urea aqueous solution injector (reducing agent adding device), 203 . . . oxidation catalyst, 301 . . . urea aqueous solution addition control unit (control device), 211 . . . NOx sensor, 212 . . . temperature sensor, 213 . . . pressure sensor, 214 . . . oxygen sensor, and 215 . . . pressure sensor.

The invention claimed is:

1. An engine exhaust purification device which reduces NOx discharged from an engine by use of ammonia as a reducing agent to purify an exhaust gas, comprising:
   a selective reduction type NOx catalyst disposed in an exhaust passage of the engine;
   a reducing agent adding device which adds ammonia or a precursor thereof to the exhaust gas of the engine on an upstream side of the NOx catalyst; and
   a control device which calculates an amount of the ammonia to be supplied to the NOx catalyst, to control the reducing agent adding device in accordance with the calculated amount of the ammonia to be supplied,
   wherein the control device includes:
      a first storage section in which there is stored a first catalytic reaction model where a chemical reaction concerned with the reduction of the NOx by use of the ammonia adsorbed on a catalyst layer of the NOx catalyst as an effective reducing agent is numerically formulated;
      an ammonia adsorption amount calculating section which acquires the first catalytic reaction model from the first storage section, and calculates ammonia adsorption amounts of a plurality of cells by the acquired first catalytic reaction model, the respective cells being obtained by dividing the inside of the NOx catalyst so that the cells are continuously aligned in an axial direction of the catalyst; and
      an ammonia supply amount calculating section which calculates the amount of the ammonia to be supplied based on the ammonia adsorption amount of the predetermined cell corresponding to an operation state of the engine, among the ammonia adsorption amounts of the respective cells which are calculated by the ammonia adsorption amount calculating section.

2. The engine exhaust purification device according to claim 1,
   wherein the first catalytic reaction model includes an equation which represents a mass balance of chemical species concerned with the reduction of NOx in each of a gas phase and a catalyst layer.

3. The engine exhaust purification device according to claim 2,
   wherein the first catalytic reaction model approximates the flow in the NOx catalyst as a one-dimensional flow in the axial direction, and includes an equation (1) which represents the mass balance of the chemical species in the gas phase, and an equation (2) which represents the mass balance of the chemical species in the catalyst layer, and a coefficient $k_i$ of the equation (2) is represented by an equation (3) in which A is a reaction frequency factor, $E_a$ is activation energy, R is a gas constant and T is a temperature

[Equation 1]

$$\frac{\partial [X_i]_{gas}}{\partial t} + \frac{\partial u[X_i]_{gas}}{\partial z} = h_i([X_i]_{cat} - [X_i]_{gas})Sv_{gas} \quad (1)$$

-continued

[Equation 2]

$$\frac{\partial [X_i]_{cat}}{\partial t} = -h_i([X_i]_{cat} - [X_i]_{gas})Sv_{cat} + \Sigma v_{k,i}k_i \prod_{k=1}^{K}[X_k]_{cat}^{\alpha_{k,i}} \quad (2)$$

[Equation 3]

$$k_i = A\exp\{-E_a/(RT)\}. \quad (3)$$

4. The engine exhaust purification device according to claim 3, further comprising:
   operation state detecting means for detecting the operation state of the engine,
   wherein the ammonia adsorption amount calculating section changes at least the coefficient $k_i$ of the equations (2) and (3) in accordance with the operation state detected by the operation state detecting means.

5. The engine exhaust purification device according to claim 1,
   wherein the cells in which the ammonia adsorption amounts are calculated include the cell positioned at the center of the NOx catalyst in the axial direction thereof among the plurality of cells.

6. The engine exhaust purification device according to claim 1,
   wherein the control device includes a response surface in which an ammonia equivalence ratio to NOx flowing into the NOx catalyst and an ammonia target adsorption amount of the NOx catalyst are set beforehand, and
   the ammonia supply amount calculating section calculates the ammonia equivalence ratio and the ammonia target adsorption amount from the response surface, and calculates the ammonia supply amount based on the calculated ammonia equivalence ratio and ammonia target adsorption amount, and the ammonia adsorption amount of the predetermined cell.

7. The engine exhaust purification device according to claim 1,
   wherein the control device further includes an ammonia target adsorption amount calculating section which calculates the ammonia target adsorption amount per cell, and stops the addition of the ammonia or the precursor by the reducing agent adding device, when the ammonia adsorption amount calculated by the ammonia adsorption amount calculating section is larger than the ammonia target adsorption amount calculated by the ammonia target adsorption amount calculating section.

8. The engine exhaust purification device according to claim 1,
   wherein the control device further includes a first catalyst temperature calculating section which calculates the temperature of the catalyst layer in each cell of the NOx catalyst as a first catalyst temperature, and
   the ammonia adsorption amount calculating section calculates the ammonia adsorption amount based on the first catalyst temperature of each cell which is calculated by the first catalyst temperature calculating section, and the ammonia supply amount calculated by the ammonia supply amount calculating section.

9. The engine exhaust purification device according to claim 1, further comprising:
   exhaust temperature detecting means for detecting an exhaust temperature on the upstream side of the NOx catalyst, wherein the control device further includes a catalyst inlet temperature calculating section which calculates, from the exhaust temperature detected by the exhaust temperature detecting means, an inlet temperature of the NOx catalyst in consideration of heat release characteristics through an exhaust pipe of the engine, and the ammonia adsorption amount calculating section calculates the ammonia adsorption amount based on the inlet temperature of the NOx catalyst which is calculated by the catalyst inlet temperature calculating section.

10. The engine exhaust purification device according to claim 9, wherein the control device further includes a first catalyst temperature calculating section which calculates a temperature of the catalyst layer in each cell of the NOx catalyst as a first catalyst temperature, based on the inlet temperature of the NOx catalyst which is calculated by the catalyst inlet temperature calculating section, and the ammonia adsorption amount calculating section calculates the ammonia adsorption amount based on the first catalyst temperature calculated by the first catalyst temperature calculating section, and the ammonia supply amount calculated by the ammonia supply amount calculating section.

11. The engine exhaust purification device according to claim 8, wherein the first catalytic reaction model further includes an equation which represents the energy balance in each of the gas phase and the catalyst layer, in addition to the equations (1) and (2), and the first catalyst temperature calculating section calculates the first catalyst temperature of each cell by the equation which represents the energy balance.

12. The engine exhaust purification device according to claim 11, wherein the first catalytic reaction model includes an equation (4) which represents the energy balance in the gas phase, and an equation (5) which represents the energy balance in the catalyst layer

[Equation 4]

$$\frac{\partial(\rho_g c_g T_g)}{\partial t} + \frac{\partial(\rho_g u c_g T_g)}{\partial z} = \alpha S v_{gas}(T_c - T_g) \quad (4)$$

[Equation 5]

$$\frac{\partial(\rho_c c_c T_c)}{\partial t} = \frac{\partial}{\partial z}\left(\lambda_c \frac{\partial}{\partial z} T_c\right) - \alpha S v_{gas}(T_c - T_g). \quad (5)$$

13. The engine exhaust purification device according to claim 1, further comprising:

an oxidation catalyst disposed on the upstream side of the NOx catalyst in the exhaust passage; and an $NO_2$ ratio calculation device which estimates an $NO_2$ ratio of the exhaust gas flowing into the NOx catalyst, wherein the $NO_2$ ratio calculation device includes:

a second storage section in which there is stored a second catalytic reaction model where an oxidation reaction of NO in the oxidation catalyst is numerically formulated; and an $NO_2$ ratio calculating section which acquires the second catalytic reaction model from the second storage section, calculates the $NO_2$ ratio of the exhaust gas passing through each of a plurality of cells by the second catalytic reaction model, the respective cells being obtained by dividing the inside of the oxidation catalyst so that the cells are continuously aligned in the axial direction of the catalyst, and calculates the $NO_2$ ratio of the exhaust gas passing through the cell positioned on the most downstream side among the plurality of cells, as the $NO_2$ ratio of the exhaust gas flowing into the NOx catalyst, and the control device calculates the amount of the ammonia to be supplied to the NOx catalyst based on the $NO_2$ ratio calculated by the $NO_2$ ratio calculation device.

14. The engine exhaust purification device according to claim 13, wherein the second catalytic reaction model includes an equation which represents a mass balance of $NO_2$, NO and $O_2$ in the oxidation catalyst in each of the gas phase and the catalyst layer.

15. The engine exhaust purification device according to claim 14, wherein the second catalytic reaction model approximates the flow in the oxidation catalyst as a one-dimensional flow in the axial direction, and includes an equation (6) which represents the mass balance in the gas phase, and an equation (7) which represents the mass balance in the catalyst layer, and a coefficient $k_i$ of the equation (7) is represented by an equation (8) in which A is a reaction frequency factor, $E_a$ is activation energy, R is a gas constant and T is a temperature

[Equation 6]

$$\frac{\partial[X_i]_{gas}}{\partial t} + \frac{\partial u[X_i]_{gas}}{\partial z} = h_i([X_i]_{cat} - [X_i]_{gas})Sv_{gas} \quad (6)$$

[Equation 7]

$$\frac{\partial[X_i]_{cat}}{\partial t} = -h_i([X_i]_{cat} - [X_i]_{gas})Sv_{cat} + \Sigma v_{k,i} k_i \prod_{k=1}^{K}[X_k]_{cat}^{\alpha_{k,i}} \quad (7)$$

[Equation 8]

$$k_i = A\exp\{-E_a/(RT)\}. \quad (8)$$

16. The engine exhaust purification device according to claim 13, wherein the $NO_2$ ratio calculation device further includes a second catalyst temperature calculating section which calculates the temperature of the catalyst layer in each cell of the oxidation catalyst as a second catalyst temperature, and the $NO_2$ ratio calculating section calculates the $NO_2$ ratio of the exhaust gas passing through each cell, based on the second catalyst temperature calculated by the second catalyst temperature calculating section.

17. The engine exhaust purification device according to claim 16, wherein the second catalytic reaction model further includes an equation which represents the energy balance in each of the gas phase and the catalyst layer, in addition to the equations (6) and (7), and the second catalyst temperature calculating section calculates the second catalyst temperature of each cell by the equation which represents the energy balance.

18. The engine exhaust purification device according to claim 17, wherein the second catalytic reaction model includes an equation (9) which represents the energy balance in the gas phase, and an equation (10) which represents the energy balance in the catalyst layer

[Equation 9]

$$\frac{\partial(\rho_g c_g T_g)}{\partial t} + \frac{\partial(\rho_g u c_g T_g)}{\partial z} = \alpha S v_{gas}(T_c - T_g) \quad (9)$$

[Equation 10]

$$\frac{\partial(\rho_c c_c T_c)}{\partial t} = \frac{\partial}{\partial z}\left(\lambda_c \frac{\partial}{\partial z} T_c\right) - \alpha S v_{gas}(T_c - T_g). \quad (10)$$

* * * * *